US012578012B2

(12) United States Patent
　　Oikawa

(10) Patent No.: US 12,578,012 B2
(45) Date of Patent: Mar. 17, 2026

(54) OIL ACCUMULATION PORTION IN A COVER MEMBER OF A DRIVE DEVICE

(71) Applicant: JATCO Ltd, Fuji City (JP)

(72) Inventor: Shota Oikawa, Fuji City (JP)

(73) Assignee: JATCO Ltd, Fuji City (JP)

( * ) Notice: Subject to any disclaimer, the term of this patent is extended or adjusted under 35 U.S.C. 154(b) by 0 days.

(21) Appl. No.: 18/843,774

(22) PCT Filed: Nov. 29, 2022

(86) PCT No.: PCT/JP2022/044062
　　§ 371 (c)(1),
　　(2) Date: Sep. 4, 2024

(87) PCT Pub. No.: WO2023/171051
　　PCT Pub. Date: Sep. 14, 2023

(65) Prior Publication Data
　　US 2025/0189034 A1　　Jun. 12, 2025

(30) Foreign Application Priority Data

Mar. 10, 2022　(JP) ................................. 2022-037177

(51) Int. Cl.
　　*F16H 57/04* 　　(2010.01)
　　*F16H 57/031* 　　(2012.01)
(52) U.S. Cl.
　　CPC ......... *F16H 57/045* (2013.01); *F16H 57/031* (2013.01); *F16H 57/0476* (2013.01); *F16H 57/0472* (2013.01)

(58) Field of Classification Search
　　CPC .............. F16H 57/031; F16H 57/0423; F16H 57/0424; F16H 57/045; F16H 57/0476
　　See application file for complete search history.

(56) References Cited

U.S. PATENT DOCUMENTS

| | | | |
|---|---|---|---|
| 2009/0127954 A1* | 5/2009 | Mogi | .................. F16H 57/0476 |
| | | | 310/90 |
| 2011/0076165 A1* | 3/2011 | Atarashi | .................. B60K 6/26 |
| | | | 417/321 |
| 2021/0041017 A1* | 2/2021 | Zanotti | ..................... F16H 1/20 |
| 2022/0042591 A1 | 2/2022 | Yu et al. | |
| 2024/0229916 A1* | 7/2024 | Oota | .................. F16H 57/0417 |

FOREIGN PATENT DOCUMENTS

| | | |
|---|---|---|
| FR | 2740853 A1 | 5/1997 |
| JP | 2005-069318 A | 3/2005 |

* cited by examiner

*Primary Examiner* — Minh Truong
(74) *Attorney, Agent, or Firm* — Foley & Lardner LLP

(57) ABSTRACT

A device includes: a motor; a gear device disposed on one side of the motor and including a first lubricated member; an oil accumulation portion provided on the other side of the motor; a second lubricated member provided in the oil accumulation portion; and a communication passage configured to allows gear device side to communicate with the oil accumulation portion, in which the communication passage is provided above respective lowest points on a lower side in a gravity direction of lubrication target locations of the first lubricated member and the second lubricated member, the oil accumulation portion includes an enlarged portion in which an upper side in the gravity direction is thicker than a lower side in an axial direction, and the lowest point of the second lubricated member is positioned in the enlarged portion.

8 Claims, 21 Drawing Sheets

OIL ACCUMULATION PORTION IN A COVER MEMBER OF A DRIVE DEVICE

TECHNICAL FIELD

The present invention relates to a device.

BACKGROUND ART

Patent Document 1 discloses a device including an oil accumulation portion. The oil accumulation portion in Patent Document 1 lubricates a bearing of a device.

PRIOR ART DOCUMENT

Patent Document

Patent Document 1: JP 2005-069318 A

SUMMARY OF INVENTION

In the device, it is required to improve lubricity.
A device according to an aspect of the present invention includes:
a motor;
a gear device disposed on one side of the motor and including a first lubricated member;
an oil accumulation portion provided on the other side of the motor;
a second lubricated member provided in the oil accumulation portion; and
a communication passage configured to allow a gear device side to communicate with the oil accumulation portion, in which
the communication passage is provided above respective lowest points on a lower side in a gravity direction of lubrication target locations of the first lubricated member and the second lubricated member,
the oil accumulation portion includes an enlarged portion in which an upper side in the gravity direction is thicker than a lower side in an axial direction, and
the lowest point of the second lubricated member is positioned in the enlarged portion.
According to an aspect of the present invention, lubricity can be improved.

DESCRIPTION OF EMBODIMENTS

Figure 1:
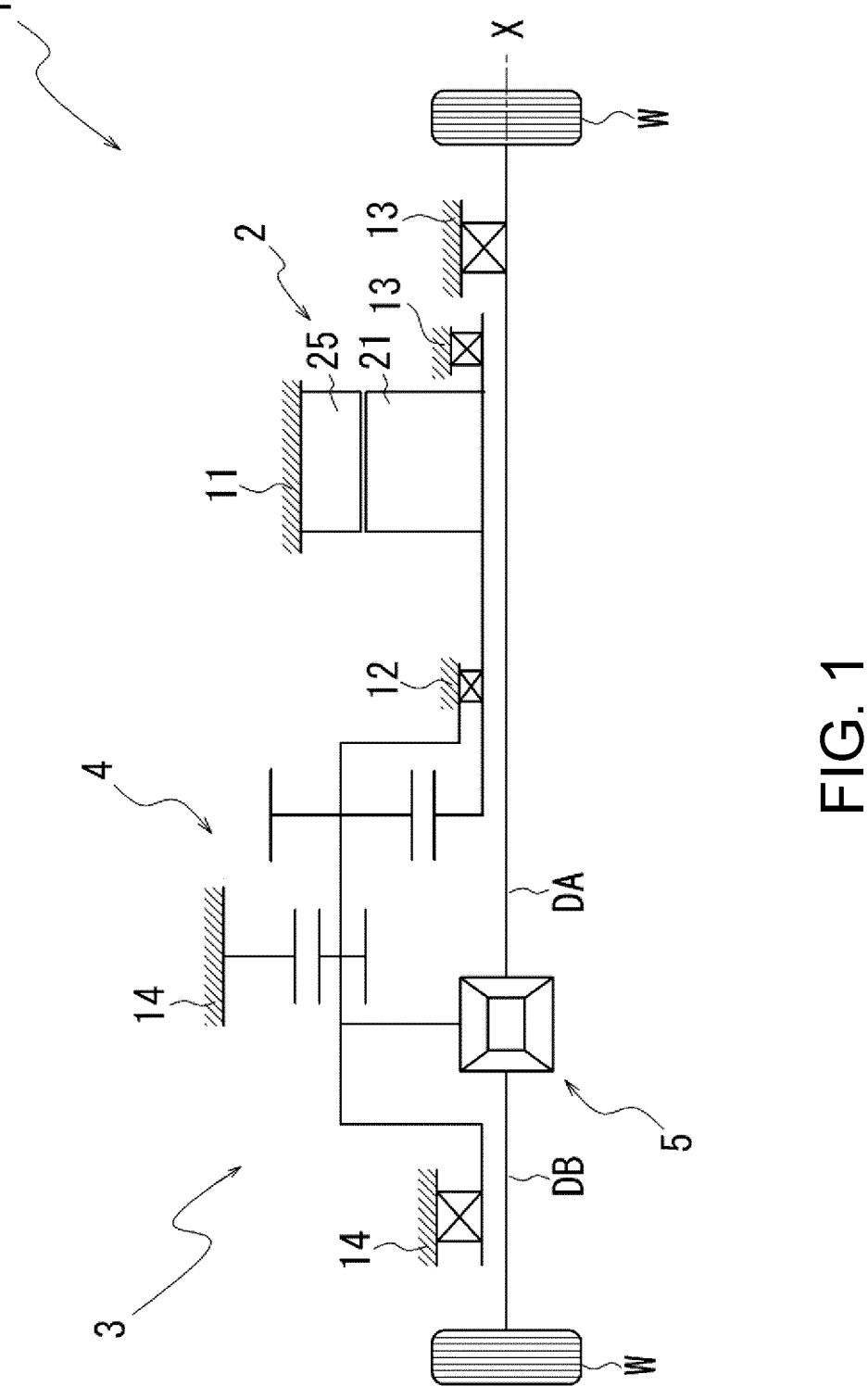
FIG. 1 is a skeleton diagram showing a power transmission device.

In the following description, when referring to a second element (member, portion, or the like) connected to a first element (member, portion, or the like), a second element (member, portion, or the like) connected downstream of a first element (member, portion, or the like), or a second element (member, portion, or the like) connected upstream of a first element (member, portion, or the like), it is meant that the first element and the second element are connected to each other in a power-transmissible manner. A power input side is upstream, and a power output side is downstream. Further, the first element and the second element may be connected to each other via another element (clutch, other gear mechanism, or the like).

"Overlapping when viewed from a predetermined direction" means that a plurality of elements are arranged in a predetermined direction, and has the same meaning as "overlapping in a predetermined direction". The "predetermined direction" is, for example, an axial direction, a radial direction, a gravity direction, or a vehicle traveling direction (vehicle forward direction and vehicle backward direction).

If a drawing shows that a plurality of elements (member, portion, or the like) are arranged in a predetermined direction, it can be considered that in explanation of the description, there is a sentence illustrating that the plurality of elements overlap when viewed from the predetermined direction.

"Not overlapping when viewed from a predetermined direction" and "offset when viewed from a predetermined direction" mean that a plurality of elements are not arranged in a predetermined direction, and has the same meaning as "not overlapping in a predetermined direction" and "offset in a predetermined direction". The "predetermined direction" is, for example, an axial direction, a radial direction, a gravity direction, or a vehicle traveling direction (vehicle forward direction and vehicle backward direction).

If a drawing shows that a plurality of elements (member, portion, or the like) are not arranged in a predetermined direction, it can be considered that in explanation of the description, there is a sentence illustrating that the plurality of elements do not overlap when viewed from the predetermined direction.

"When viewed from a predetermined direction, a first element (member, portion, or the like) is positioned between a second element (member, portion, or the like) and a third element (member, portion, or the like)" means that the first element can be observed to be between the second element and the third element when viewed from the predetermined direction. The "predetermined direction" is, for example, an axial direction, a radial direction, a gravity direction, or a vehicle traveling direction (vehicle forward direction and vehicle backward direction).

For example, when the second element, the first element, and the third element are arranged in this order along the axial direction, it can be said that the first element is positioned between the second element and the third element when viewed from the radial direction. If a drawing shows that a first element is between a second element and a third element when viewed from a predetermined direction, it can be considered that in explanation of the description, there is a sentence illustrating that the first element is between the second element and the third element when viewed from the predetermined direction.

When two elements (member, portion, or the like) overlap when viewed from the axial direction, the two elements are coaxial.

The "axial direction" means an axial direction of a rotation axis of a member that constitutes a power transmission device. The "radial direction" means a direction orthogonal to the rotation axis of the member that constitutes the power transmission device. The member is, for example, a motor, a gear mechanism, or a differential gear mechanism.

Hereinafter, a case in which an embodiment of the present invention is applied to a power transmission device provided in a vehicle will be described as an example.

FIG. 1 is a skeleton diagram illustrating a power transmission device 1.

Figure 2:
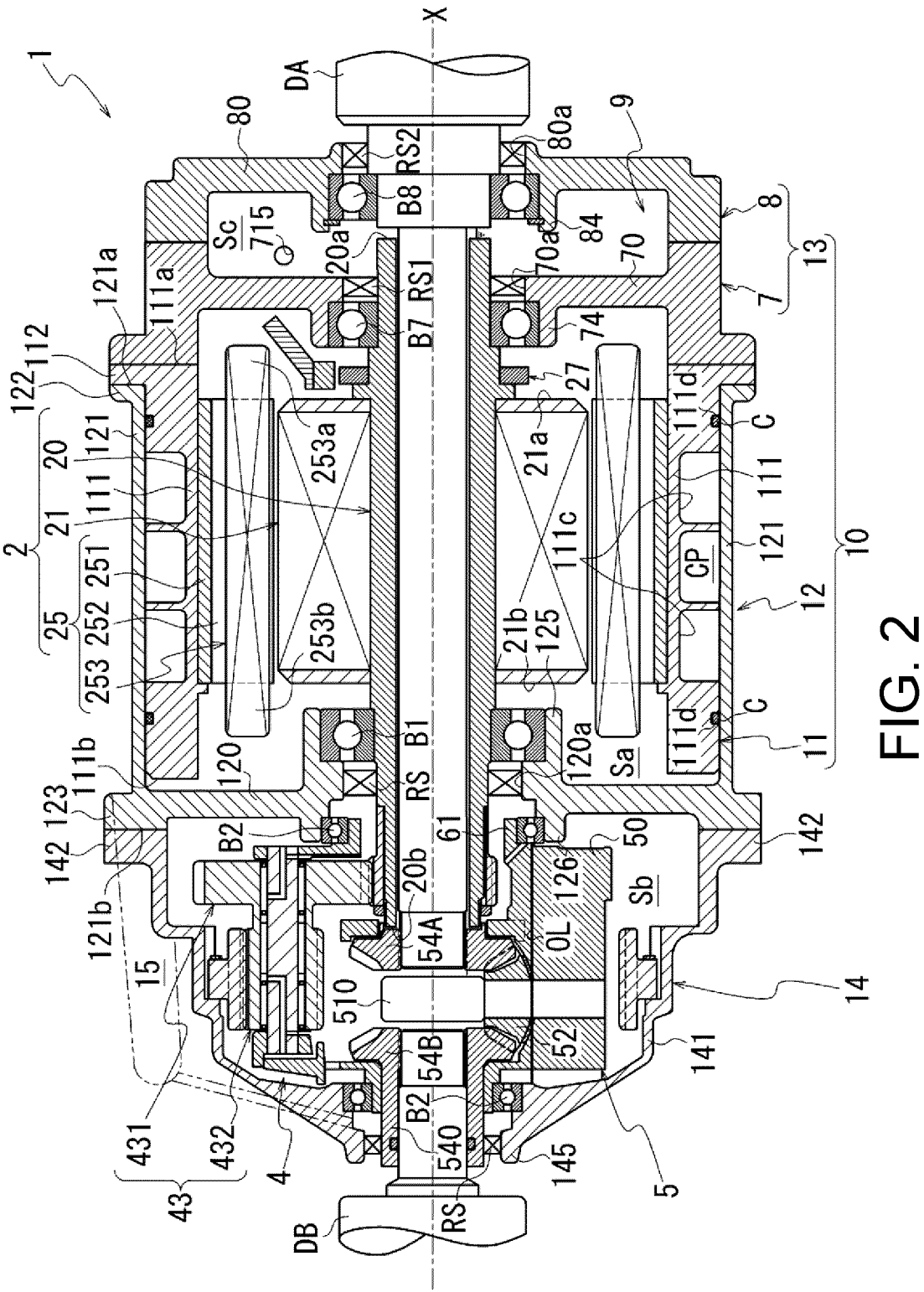
FIG. 2 is a schematic cross-sectional view of the power transmission device.

FIG. 2 is a schematic cross-sectional view of the power transmission device 1. In FIG. 2, a lip seal is illustrated in a simplified manner.

As illustrated in FIG. 1, the power transmission device 1 includes a motor 2 and a gear device 3 that transmits output rotation of the motor 2 to drive shafts DA and DB (driving shaft). A "motor" is a rotation electrical machine having an electric motor function and/or a generator function.

In the power transmission device 1, the gear device 3 and the drive shafts DA and DB are provided along a transmission path of the output rotation of the motor 2 around a rotation axis X.

In the power transmission device 1, the output rotation of the motor 2 is transmitted to the drive shafts DA and DB via the gear device 3. In this way, left and right drive wheels W, W are driven.

The gear device 3 includes a planetary reduction gear 4 (speed reduction mechanism) and a differential mechanism 5 (differential gear mechanism). The planetary reduction gear 4 is connected downstream of the motor 2. The differential mechanism 5 is connected downstream of the planetary reduction gear 4. The drive shafts DA and DB are connected downstream of the differential mechanism 5.

The planetary reduction gear 4 reduces a speed of the output rotation of the motor 2 and inputs the output rotation to the differential mechanism 5. The differential mechanism 5 transmits the rotation input from the planetary reduction gear 4 to the drive shafts DA and DB.

As shown in FIG. 2, the power transmission device 1 includes a motor case 10 and a gear case 14. The motor case 10 accommodates the motor 2. The gear case 14 accommodates the planetary reduction gear 4 and the differential mechanism 5. The gear case 14 is joined to one end side of the motor case 10 in a direction of the rotation axis X.

As shown in FIG. 2, the motor 2 has a portion overlapping with the differential mechanism 5 (differential gear mechanism) when viewed in an axial direction. Here, "when viewed in an axial direction" means when viewed from the direction of the rotation axis X.

When viewed in the axial direction, the motor 2 has a portion overlapping with the planetary reduction gear 4 (reduction gear mechanism).

When viewed in the axial direction, the planetary reduction gear 4 (reduction gear mechanism) has a portion overlapping with the differential mechanism 5 (differential gear mechanism).

When viewed in the axial direction, the planetary reduction gear 4 (reduction gear mechanism) has a portion overlapping with the motor 2.

When viewed in the axial direction, the differential mechanism 5 (differential gear mechanism) has a portion overlapping with the planetary reduction gear 4 (reduction gear mechanism).

When viewed in the axial direction, the differential mechanism 5 (differential gear mechanism) has a portion overlapping with the motor 2.

When viewed in the axial direction, the motor 2 has a portion overlapping with the differential mechanism 5 (differential gear mechanism).

As illustrated in FIG. 2, the motor case 10 includes a first case member 11, a second case member 12 fitted onto the first case member 11, and a cover member 13 joined to one end of the first case member 11.

The first case member 11 includes a cylindrical support wall portion 111 and a flange-shaped joining portion 112 provided at one end 111a of the support wall portion 111.

The support wall portion 111 is provided in a direction along the rotation axis X of the motor 2. The motor 2 is accommodated inside the support wall portion 111.

The second case member 12 includes a cylindrical peripheral wall portion 121, a flange-shaped joining portion 122 provided at one end 121a of the peripheral wall portion 121, and a flange-shaped joining portion 123 provided at the other end 121b of the peripheral wall portion 121.

The peripheral wall portion 121 of the second case member 12 is formed with an inner diameter that allows the peripheral wall portion 121 to be fitted onto the support wall portion 111 of the first case member 11.

The first case member 11 and the second case member 12 are assembled to each other by fitting the peripheral wall portion 121 of the second case member 12 onto the support wall portion 111 of the first case member 11.

The joining portion 122 at the one end 121a of the peripheral wall portion 121 abuts against the joining portion 112 of the first case member 11 from the direction of the rotation axis X. The joining portions 122 and 112 are connected to each other by bolts (not shown).

In the first case member 11, a plurality of recessed grooves 111c are provided in an outer periphery of the support wall portion 111. The plurality of recessed grooves 111c are provided at intervals in the direction of the rotation axis X. The recessed grooves 111c are provided over an entire circumference in a circumferential direction around the rotation axis X.

When the peripheral wall portion 121 of the second case member 12 is fitted onto the support wall portion 111 of the first case member 11, an opening of the recessed groove 111c is closed by the peripheral wall portion 121. Accordingly, a plurality of cooling paths CP through which a coolant flows are formed between the support wall portion 111 and the peripheral wall portion 121. A "coolant" is a refrigerant, and is, for example, a liquid (cooling water or the like) or a gas (air or the like).

In the outer periphery of the support wall portion 111 of the first case member 11, ring grooves 111d and 111d are formed on both sides of a region where the recessed grooves 111c are provided. Seal members C, C are fitted and attached to an outside of the ring grooves 111d, 111d.

The seal members C, C are pressed against an inner periphery of the peripheral wall portion 121 fitted onto the support wall portion 111 to seal a gap between the outer periphery of the support wall portion 111 and the inner periphery of the peripheral wall portion 121.

As shown in FIG. 2, a wall portion 120 extending radially inward is provided on the other end 121b of the second case member 12. The wall portion 120 is provided in a direction orthogonal to the rotation axis X. An opening 120a through which the drive shaft DA is inserted is opened in a region of the wall portion 120 intersecting with the rotation axis X.

In the wall portion 120, a motor support portion 125 extending toward the motor 2 is provided on a surface on the motor 2 side (right side in the figure). The motor support portion 125 has a tubular shape surrounding the opening 120a with an interval therebetween.

The motor support portion 125 is inserted inside a coil end 253b, which will be described later. The motor support portion 125 faces an end 21b of a rotor core 21 with a gap therebetween in the direction of the rotation axis X. A bearing B1 is supported on an inner periphery of the motor support portion 125. An outer periphery of a motor shaft 20 is supported by the motor support portion 125 via the bearing B1.

A tubular wall portion 126 extending toward the differential mechanism 5 is provided on a surface of the wall portion 120 on a differential mechanism 5 side (left side in the figure). The tubular wall portion 126 has a tubular shape surrounding the opening 120a. A bearing B2 is supported on an inner periphery of the tubular wall portion 126. The bearing B2 supports a tubular wall portion 61 of a differential case 50, which will be described later.

As shown in FIG. 2, the gear case 14 includes a tubular peripheral wall portion 141 surrounding the rotation axis X, and a flange-shaped joining portion 142 provided at an end portion of the peripheral wall portion 141 on a motor case 10 side. A support portion 145 for the bearing B2, which will be described later, is provided at an end portion of the peripheral wall portion 141 on a side (left side in the figure) opposite to the joining portion 142. The planetary reduction gear 4 and the differential mechanism 5 are accommodated inside the peripheral wall portion 141.

The gear case 14 is positioned on the differential mechanism 5 side (left side in the figure) when viewed from the motor case 10. The joining portion 142 of the gear case 14 is joined to the joining portion 123 of the second case member 12 of the motor case 10 from the direction of the rotation axis X. The gear case 14 and the second case member 12 are connected to each other by bolts (not shown).

A space formed inside the joined motor case 10 and gear case 14 is divided into two spaces by the wall portion 120 of the second case member 12. A side of the wall portion 120 in the motor case 10 is a motor chamber Sa that accommodates the motor 2, and a side of the wall portion 120 in the gear case 14 is a gear chamber Sb that accommodates the planetary reduction gear 4 and the differential mechanism 5. The wall portion 120 is sandwiched between the motor 2 and the differential mechanism 5 in the direction of the rotation axis X.

As shown in FIG. 2, the motor 2 includes the cylindrical motor shaft 20, the cylindrical rotor core 21 fitted onto the motor shaft 20, and a stator core 25 surrounding an outer periphery of the rotor core 21 with an interval therebetween.

Bearings B7 and B1 are fitted onto one end 20a and the other end 20b of the motor shaft 20, respectively, with the rotor core 21 sandwiched therebetween. The motor shaft 20 is rotatably supported by motor support portions 74, 125 via the bearings B7, B1.

The motor support portions 74 and 125 are disposed at the other end 21a and the one end 21b of the rotor core 21, facing each other with a gap in the direction of the rotation axis X.

The rotor core 21 is formed by laminating a plurality of silicon steel sheets. Each of the silicon steel sheets is fitted onto the motor shaft 20 such that relative rotation with respect to the motor shaft 20 is restricted.

When viewed from the direction of the rotation axis X of the motor shaft 20, the silicon steel sheet has a ring shape. On an outer peripheral side of the silicon steel sheet, N-pole and S-pole magnets (not shown) are alternately provided in the circumferential direction around the rotation axis X.

The stator core 25 surrounding the outer periphery of the rotor core 21 is formed by laminating a plurality of electromagnetic steel sheets. The stator core 25 is fixed to an inner periphery of the cylindrical support wall portion 111 of the first case member 11.

Each of the electromagnetic steel sheets includes a ring-shaped yoke portion 251 fixed to the inner periphery of the support wall portion 111, and teeth portions 252 protruding from an inner periphery of the yoke portion 251 toward the rotor core 21.

In the present embodiment, the stator core 25 in which a winding 253 is wound around a plurality of the teeth portions 252 in a distributed manner is adopted. The stator core 25 is longer than the rotor core 21 in the direction of the rotation axis X by lengths of coil ends 253a and 253b protruding in the direction of the rotation axis X.

A stator core in which a winding is wound in a concentrated manner on each of the plurality of teeth portions 252 protruding toward the rotor core 21 may be adopted.

As shown in FIG. 2, the other end 20b side of the motor shaft 20 penetrates through the opening 120a toward the differential mechanism 5 (left side in the figure) and is positioned in the gear case 14.

The other end 20b of the motor shaft 20 faces a side gear 54A, which will be described later, inside the gear case 14 with a gap therebetween in the direction of the rotation axis X.

A lip seal RS is inserted between the motor shaft 20 and the opening 120a of the wall portion 120.

Oil OL that lubricates the planetary reduction gear 4 and the differential mechanism 5 is sealed on an inner diameter side of the gear case 14.

The lip seal RS is provided to prevent the oil OL in the gear case 14 from flowing into the motor chamber Sa.

Figure 3:
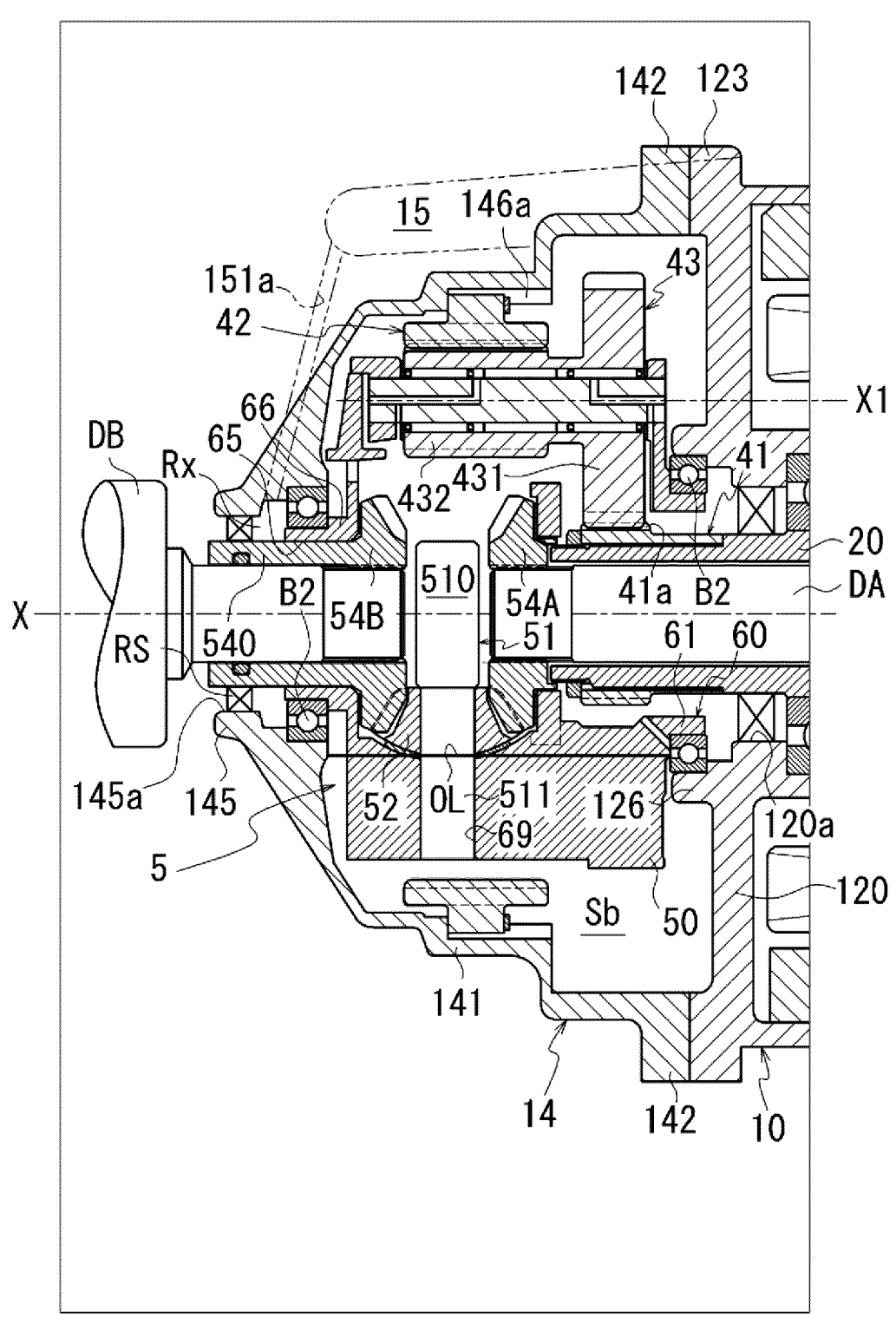
FIG. 3 is an enlarged view around a gear device.

FIG. 3 is an enlarged view around the gear device 3.

Figure 4:
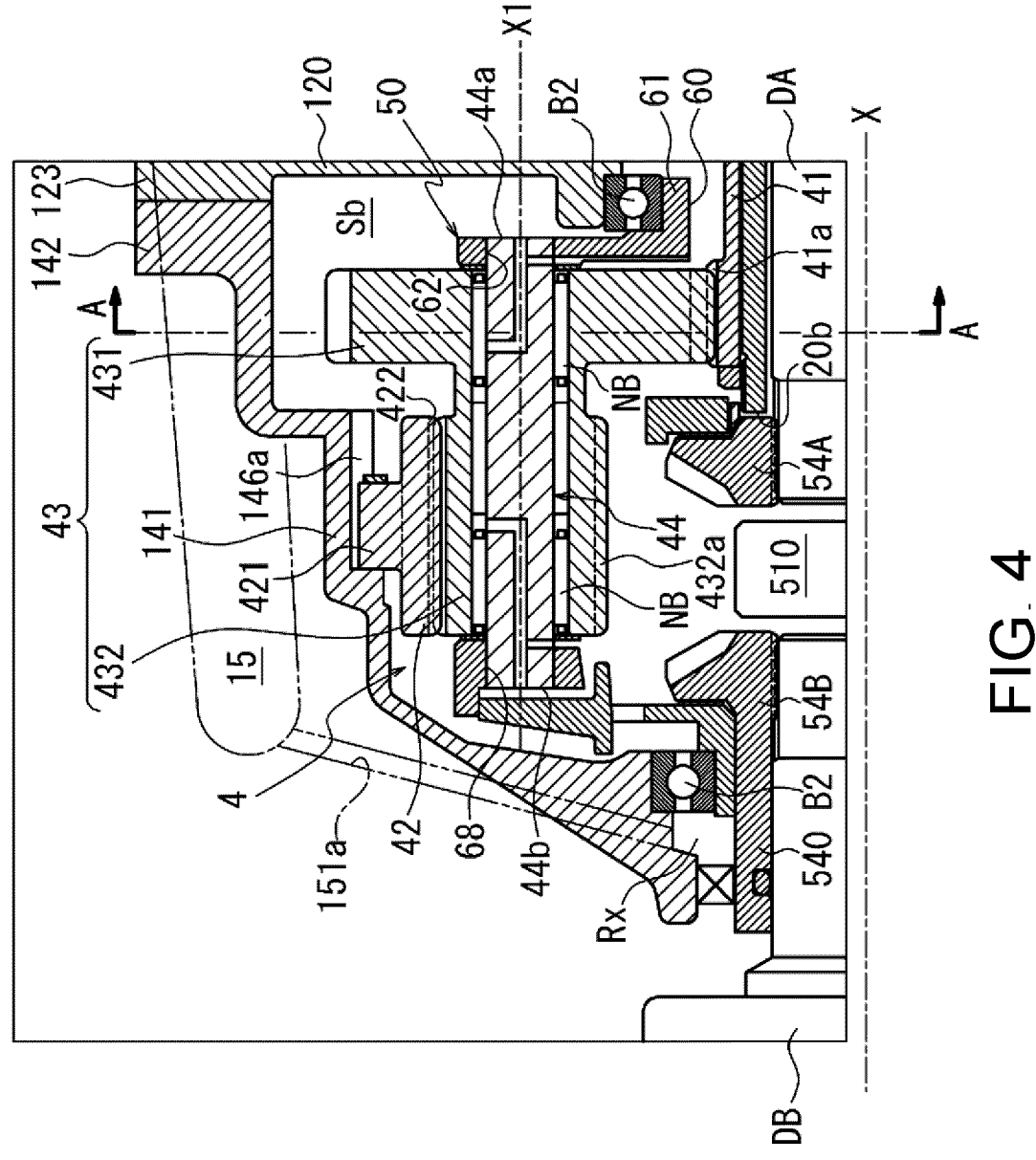
FIG. 4 is an enlarged view around a planetary reduction gear.

FIG. 4 is an enlarged view around the planetary reduction gear 4.

Figure 5:
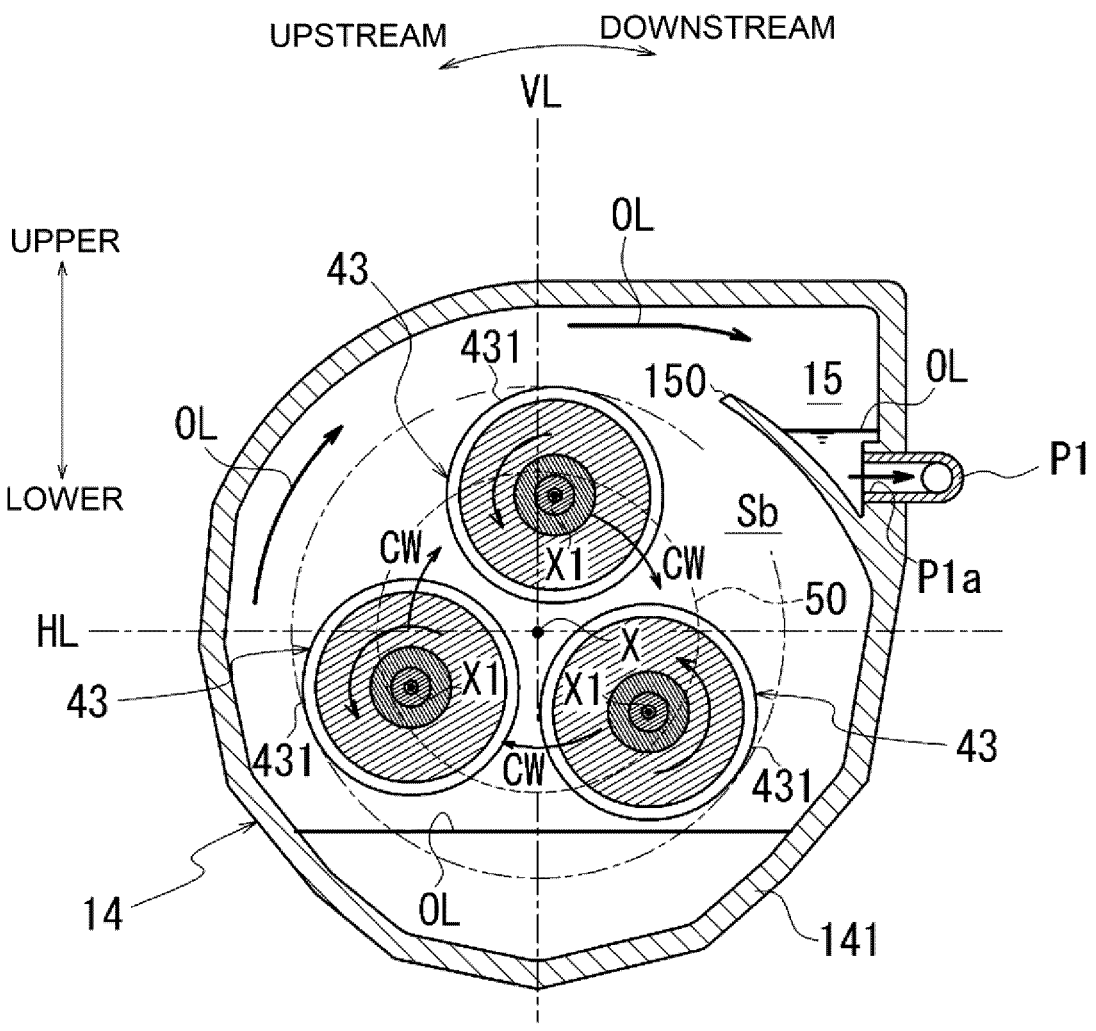
FIG. 5 is a view illustrating rotation of a differential case.

FIG. 5 is a view illustrating rotation of the differential case 50. FIG. 5 is a schematic view of a cross section taken along a line A-A in FIG. 4.

Figure 6:
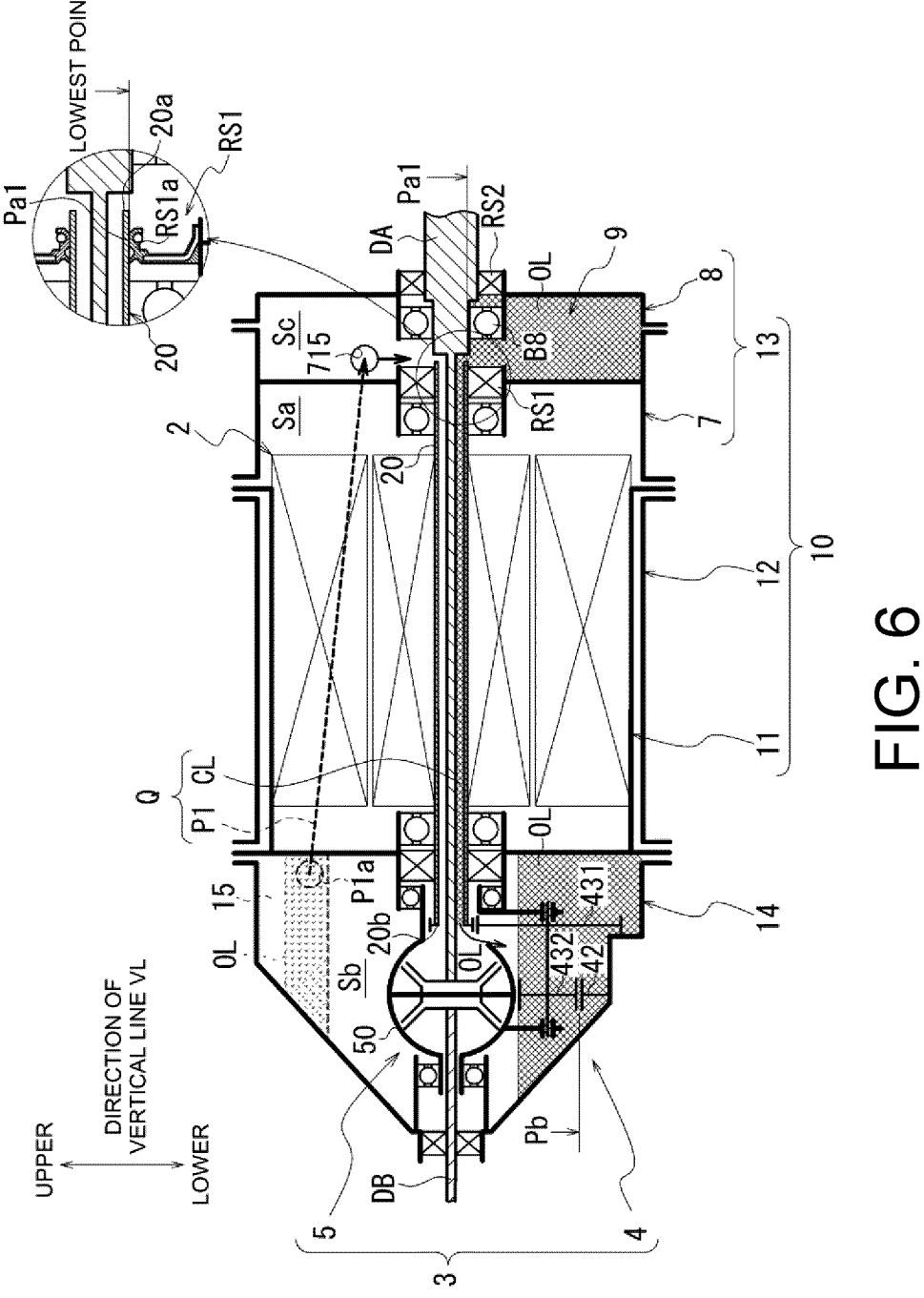
FIG. 6 is a view illustrating circulation of oil in the power transmission device.

FIG. 6 is a view illustrating circulation of the oil OL in the power transmission device 1.

Figure 7:
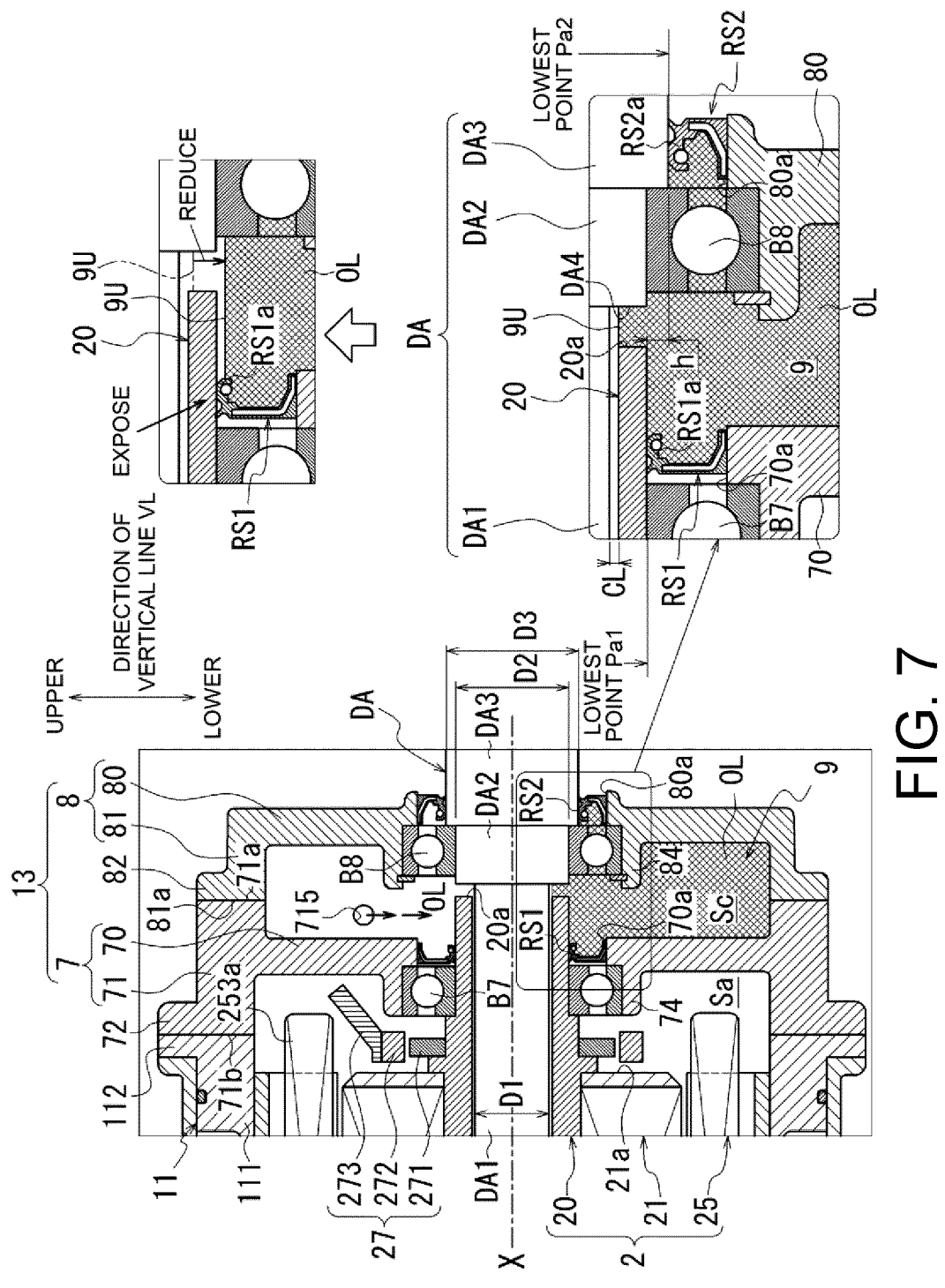
FIG. 7 shows enlarged views around a cover member.

FIG. 7 is an enlarged view around the cover member 13.

As shown in FIG. 3, a sun gear 41 of the planetary reduction gear 4 is spline-fitted in a region of the motor shaft 20 positioned in the gear case 14.

A tooth portion 41a is formed on an outer periphery of the sun gear 41. A large-diameter gear portion 431 of a stepped pinion gear 43 meshes with the tooth portion 41a.

The stepped pinion gear 43 includes a large-diameter gear portion 431 (large pinion) that meshes with the sun gear 41 and a small-diameter gear portion 432 (small pinion) that has a smaller diameter than the large-diameter gear portion 431.

The large-diameter gear portion 431 and the small-diameter gear portion 432 are integrated gear components disposed side by side in a direction of an axis X1 parallel to the rotation axis X.

As shown in FIG. 4, a pinion shaft 44 penetrates inner diameter sides of the large-diameter gear portion 431 and the small-diameter gear portion 432. The stepped pinion gear 43 is rotatably supported on an outer periphery of the pinion shaft 44 via needle bearings NB and NB.

A tooth portion 432a of the small-diameter gear portion 432 meshes with inner peripheral teeth 422 of a ring gear 42. The ring gear 42 has a ring shape surrounding the rotation axis X with an interval therebetween. A plurality of engagement teeth 421 protruding outward in the radial direction are provided on an outer periphery of the ring gear 42. The plurality of engagement teeth 421 are disposed at intervals in the circumferential direction about the rotation axis X. The engagement teeth 421 provided on the outer periphery of the ring gear 42 are spline-fitted to tooth portions 146a provided on an inner periphery of the peripheral wall portion 141. Accordingly, the ring gear 42 is restricted from rotating around the rotation axis X.

As shown in FIG. 3, the differential mechanism 5 includes the differential case 50 (differential case) as an input element, the drive shafts DA and DB (output shafts) as output elements, and a differential gear set as a differential element. Although detailed description is omitted, the differential case 50 may include two case members assembled in the direction of the rotation axis X.

As shown in FIG. 4, the differential case 50 also functions as a carrier that supports the stepped pinion gear 43 of the planetary reduction gear 4. The stepped pinion gear 43 is rotatably supported by the differential case 50 via the pinion shaft 44. Three stepped pinion gears 43 are disposed at intervals in the circumferential direction about the rotation axis X (see FIG. 5).

As shown in FIG. 3, the differential gear set is provided in the differential case 50. The differential gear set includes a pinion mate gear 52 and side gears 54A, 54B. The pinion mate gear 52 is a bevel gear type differential gear. The pinion mate gear 52 is supported by a pinion mate shaft 51.

The pinion mate shaft 51 includes a center member 510 and a shaft member 511 connected to an outer diameter side of the center member 510. The center member 510 is disposed on the rotation axis X. Although not illustrated, a plurality of shaft members 511 are provided at equal intervals in the circumferential direction around the rotation axis X. The shaft member 511 is inserted into a support hole 69 of the differential case 50.

The pinion mate gear 52 are fitted onto each of the shaft members 511. The pinion mate gear 52 is rotatably supported by each of the shaft members 511.

As shown in FIG. 3, in the differential case 50, the side gear 54A is positioned on one side of the center member 510 in the direction of the rotation axis X, and the side gear 54B is positioned on the other side thereof. The side gears 54A and 54B are each rotatably supported by the differential case 50.

The side gear 54A meshes with the pinion mate gear 52 from the one side in the direction of the rotation axis X. The side gear 54B meshes with the pinion mate gear 52 from the other side in the direction of the rotation axis X.

An opening 60 and the tubular wall portion 61 are provided in a central portion of the differential case 50 on one end side (right side in the figure). The tubular wall portion 61 surrounds the opening 60 and extends in a direction away from the side gear 54A. An outer periphery of the tubular wall portion 61 is rotatably supported by the wall portion 120 of the second case member 12 via a bearing B2.

The drive shaft DA inserted through the opening 60 is inserted into the differential case 50 from the direction of the rotation axis X.

As shown in FIG. 2, the motor shaft 20 of the motor 2 and an inner diameter side of the sun gear 41 (see FIG. 4) of the planetary reduction gear 4 are provided to cross the direction of the rotation axis X.

As shown in FIG. 3, a through hole 65 and a tubular wall portion 66 surrounding the through hole 65 are formed in a central portion of the differential case 50 on the other end side (left side in the figure). The bearing B2 is fitted onto the tubular wall portion 66. The bearing B2 is held by the support portion 145 of the gear case 14. The tubular wall portion 66 of the differential case 50 is rotatably supported by the gear case 14 via the bearing B2.

The drive shaft DB and a tubular wall portion 540 of the side gear 54B penetrate an opening portion 145a of the support portion 145 in the direction of the rotation axis X. The tubular wall portion 540 is fitted onto the drive shaft DB.

A lip seal RS is fixed to an inner periphery of the opening portion 145a. A lip portion (not shown) of the lip seal RS is in elastic contact with an outer periphery of the tubular wall portion 540 of the side gear 54B.

Accordingly, a gap between the outer periphery of the tubular wall portion 540 of the side gear 54B and the inner periphery of the opening portion 145a is sealed.

As shown in FIG. 3, in the differential case 50, tip portions of the drive shafts DA and DB face each other with an interval therebetween in the direction of the rotation axis X.

The side gears 54A and 54B supported by the differential case 50 are spline-fitted to outer peripheries of the tip portions of the drive shafts DA and DB. The side gears 54A, 54B and the drive shafts DA, DB are connected so as to be rotatable together about the rotation axis X.

In this state, the side gears 54A and 54B are disposed facing each other with an interval therebetween in the direction of the rotation axis X. The center member 510 of the pinion mate shaft 51 is positioned between the side gears 54A and 54B.

The pinion mate gear 52 of the pinion mate shaft 51 is assembled to the side gear 54A positioned on the one side in the direction of the rotation axis X and the side gear 54B positioned on the other side in a state in which teeth portions thereof are meshed with each other.

As shown in FIG. 4, a support hole 62 on one end 44a side of the pinion shaft 44 is formed an outer diameter side of the opening 60 on one end side (right side in the figure) of the differential case 50. A support hole 68 on the other end 44b side of the pinion shaft 44 is formed on the other end side (left side in the figure) of the differential case 50.

The support holes 62 and 68 are formed at positions that overlap in the direction of the axis X1. The support holes 62 and 68 are formed at intervals in the circumferential direction around the rotation axis X in accordance with a position in which the stepped pinion gear 43 is disposed. The one end 44a of the pinion shaft 44 is inserted into the support hole 62, and the other end 44b is inserted into the support hole 68. The other end 44b of the pinion shaft 44 is press-fitted into the support hole 68. The pinion shaft 44 is fixed so as not to be rotatable relative to the differential case 50. The stepped pinion gear 43 fitted onto the pinion shaft 44 is rotatably supported around the axis X1 parallel to the rotation axis X.

As shown in FIG. 3, the oil OL for lubrication is stored inside the gear case 14. When the vehicle equipped with the power transmission device 1 is traveling, the differential case 50 positioned in the shape of the output rotation of the motor 2 rotates around the rotation axis X. When the differential case 50 rotates about the rotation axis X, the oil OL stored in a lower portion of the gear case 14 is raked up by the rotating differential case 50 and moves toward an upper portion of the gear case 14.

As shown in FIG. 5, in the gear case 14, a catch tank 15 is provided above a space (gear chamber Sb) that accommodates the differential case 50. The catch tank 15 is positioned on one side (right side in the figure) of a vertical line VL orthogonal to the rotation axis X. The catch tank 15 communicates with the gear chamber Sb via a communication port 150. Accordingly, a part of the oil OL raked up by the differential case 50 flows into the catch tank 15.

As shown in FIG. 5, the catch tank 15 is positioned on a right side of the vertical line VL, that is, on a downstream side in a rotation direction of the differential case 50. Accordingly, most of the oil OL raked up by the differential case 50 rotating around the rotation axis X can flow into the catch tank 15.

As shown in FIG. 5, a pipe P1 is connected to the catch tank 15. The pipe P1 is provided to supply the oil OL flowing into the catch tank 15 to a space Sc in the cover member 13.

The pipe P1 passes outside the motor case 10 and is provided from the gear case 14 to the cover member 13. One end of the pipe P1 opens into the catch tank 15, and the other end opens into the space Sc in the cover member 13.

As shown in FIG. 2, when viewed from the first case member 11, the cover member 13 is positioned on an opposite side (right side in the figure) to the differential mechanism 5.

As shown in FIG. 7, the cover member 13 includes a first cover 7 and a second cover 8. The first cover 7 and the second cover 8 are overlapped and joined in the direction of the rotation axis X. When viewed from the first cover 7, the second cover 8 is positioned on an opposite side (right side in the figure) to the motor 2.

As shown in FIG. 7, the first cover 7 includes a tubular peripheral wall portion 71 surrounding the rotation axis X and a wall portion 70 extending radially inward from the peripheral wall portion 71. The wall portion 70 extends radially inward from a region between one end 71a and the other end 71b of the peripheral wall portion 71 in the direction of the rotation axis X. The wall portion 70 is provided in a direction orthogonal to the rotation axis X.

A flange-shaped joining portion 72 is provided on the other end 71b of the peripheral wall portion 71.

The joining portion 72 is joined to the joining portion 112 of the first case member 11 from the direction of the rotation axis X. The first cover 7 and the first case member 11 are connected to each other by bolts (not shown). In this state, in the first case member 11, an opening of the motor chamber Sa is closed by the first cover 7.

In the first cover 7, an insertion hole 70a is provided in a central portion of the wall portion 70. The insertion hole 70a penetrates the wall portion 70 in the direction of the rotation axis X.

The motor shaft 20, which is fitted onto the drive shaft DA, is disposed so as to pass through the insertion hole 70a in the direction of the rotation axis X.

A lip seal RS1 is provided on an inner periphery of the insertion hole 70a. The lip seal RS1 includes a lip portion RS1a that is in elastic contact with the outer periphery of the motor shaft 20. A gap between the inner periphery of the insertion hole 70a and the outer periphery of the motor shaft 20 is sealed by the lip seal RS1.

The motor support portion 74 extending toward the motor 2 is provided on a surface of the wall portion 70 on the motor 2 side (left side in the figure). The motor support portion 74 has a tubular shape surrounding the insertion hole 70a.

The bearing B7 is supported on an inner periphery of the motor support portion 74. The outer periphery of the motor shaft 20 is supported by the motor support portion 74 via the bearing B7. The lip seal RS1 is provided on a second cover 8 side when viewed from the bearing B7.

As shown in FIG. 7, a sensor 27 is disposed between the wall portion 70 and the rotor core 21. The sensor 27 is provided to detect the rotation of the motor 2 (motor shaft 20).

The sensor 27 is, for example, a known resolver. The sensor 27 includes a rotor portion 271, a stator portion 272, and a connector portion 273.

The rotor portion 271 is externally fitted and attached to the motor shaft 20. The stator portion 272 has a ring shape having an inner diameter larger than an outer diameter of the rotor portion 271.

The stator portion 272 is supported on a motor case 10 side via a bracket (not shown). In this state, the stator portion 272 is disposed so as to surround an outer periphery of the rotor portion 271 with an interval therebetween.

The coil end 253a of the motor 2 is positioned on an outer diameter side of the stator portion 272. An end portion of the coil end 253a faces the wall portion 70 with an interval therebetween in the direction of the rotation axis X.

Therefore, a gap through which a wire (not shown) extending from the connector portion 273 of the sensor 27 can pass is ensured between the coil end 253a and the wall portion 70.

Thus, the motor chamber Sa has a radial space between the coil end 253a and the motor shaft 20. The sensor 27 is provided above the rotation axis X in a direction of the vertical line VL (gravity direction), using the space between the coil end 253a and the motor shaft 20.

As shown in FIG. 7, the second cover 8 includes a wall portion 80 orthogonal to the rotation axis X and a peripheral wall portion 81 surrounding an entire circumference of an outer peripheral edge of the wall portion 80. The peripheral wall portion 81 extends from the wall portion 80 toward the first cover 7 along the rotation axis X. A flange-shaped joining portion 82 is provided at a tip 81a of the peripheral wall portion 81.

The joining portion 82 of the second cover 8 is joined to the one end 71a of the peripheral wall portion 71 of the first cover 7 from the direction of the rotation axis X. The joining portion 82 of the second cover 8 is connected to the peripheral wall portion 71 of the first cover 7 with a bolt (not shown).

An insertion hole 80a of the drive shaft DA is provided in a central portion of the wall portion 80 of the second cover 8. A lip seal RS2 is provided on an inner periphery of the insertion hole 80a. The lip seal RS2 includes a lip portion RS2a that is in elastic contact with an outer periphery of the drive shaft DA. A gap between the inner periphery of the insertion hole 80a and the outer periphery of the drive shaft DA is sealed by the lip seal RS2.

A peripheral wall portion 84 surrounding the insertion hole 80a is provided on a surface of the wall portion 80 on a first cover 7 side (left side in the figure). The drive shaft DA is supported on an inner periphery of the peripheral wall portion 84 via a bearing B8. The lip seal RS2 is provided on a side opposite to the first cover 7 when viewed from the bearing B8.

As shown in FIG. 7, when the first cover 7 and the second cover 8 are overlapped in the direction of the rotation axis X to form the cover member 13, the space Sc is formed inside the cover member 13. The space Sc is a space surrounded by the wall portion 70 and the peripheral wall portion 71 of the first cover 7, and the wall portion 80 and the peripheral wall portion 81 of the second cover 8. The space Sc is a closed space by the lip seals RS1 and RS2 sealing a gap between the motor shaft 20 and the drive shaft DA.

An oil hole 715 communicating with the pipe P1 is opened on an inner periphery of the peripheral wall portion 71 of the first cover 7.

As shown in FIG. 6, the oil hole 715 is opened below an opening P1a of the pipe P1 that opens into the catch tank 15 in the direction of the vertical line VL.

Therefore, the oil OL stored in the catch tank 15 can flow into the space Sc through the pipe P1 by an own weight.

The oil hole 715 is opened above the lip seals RS1 and RS2 in the direction of the vertical line VL. The lip seal RS1 prevents the oil OL in the space Sc from flowing into the motor chamber Sa. The lip seal RS2 prevents the oil OL in the space Sc from flowing out of the cover member 13.

Therefore, when the oil OL continues to flow into the space Sc, a height of the oil OL stored in the space Sc increases with time.

Here, the one end 20a of the motor shaft 20 is opened in the space Sc. The other end 20b of the motor shaft 20 is opened in a space (gear chamber Sb) in the gear case 14. Further, a gap CL through which the oil OL can pass is provided between an inner periphery of the motor shaft 20 and the outer periphery of the drive shaft DA penetrating the motor shaft 20.

Therefore, the gap CL between the inner periphery of the motor shaft 20 and the outer periphery of the drive shaft DA functions as a communication passage that equalizes heights of the oil OL in the space Sc and the gear chamber Sb.

When the vehicle equipped with the power transmission device 1 is traveling, the oil OL in the gear chamber Sb is raked up by the rotating differential case 50. Therefore, the height of the oil OL in the gear chamber Sb is lower than a height of the other end 20b of the motor shaft 20.

Thus, when the height of the oil OL flowing into the space Sc reaches a height at which the gap CL between the outer periphery of the drive shaft DA and the inner periphery of the motor shaft 20 is provided, the oil OL in the space Sc is returned into the gear chamber Sb through the gap CL.

That is, the oil OL that exceeds the height of the gap CL between the outer periphery of the drive shaft DA and the inner periphery of the motor shaft 20 passes through the gap CL and is returned into the gear chamber Sb.

Therefore, the height of the oil OL in the space Sc is maintained at a height that does not exceed the gap CL.

Thus, a certain volume of oil OL is retained in the space Sc. The oil OL stored in the space Sc corresponds to an oil accumulation portion 9 in the present invention.

The oil OL stored in the space Sc is used for lubrication of the bearing B8 and lubrication of a contact portion between the lip seals RS1 and RS2 and the drive shaft DA.

The pipe P1 and the gap CL constitute a communication passage Q that allows the gear chamber Sb, which is a space on the gear device 3 side, to communicate with the oil accumulation portion 9. The communication passage Q is positioned above a lowest point Pb of a meshing portion between the ring gear 42 in the planetary reduction gear 4 and the small-diameter gear portion 432 and a lowest point Pa1 of a contact portion between the lip seal RS1 and the motor shaft 20, which will be described below, in the direction of the vertical line VL.

Here, the lowest points Pb and Pa1 refer to apexes on a lower side in the direction of the vertical line VL when viewed from the direction of the rotation axis X. When viewed from the radial direction of the rotation axis X, these lowest points Pb and Pa1 form a ridgeline having a width in the direction of the rotation axis X.

As shown in FIG. 7, a diameter of the drive shaft DA in a region positioned in the space Sc gradually decreases toward the motor 2 (left side in the figure). The region positioned in the space Sc of the drive shaft DA includes a first region DA1 inserted into the motor shaft 20, a second region DA2 to which the bearing B8 is inserted, and a third region DA3 circumscribed by the lip seal RS2. Respective outer diameters D1, D2, and D3 of the first region DA1, the second region DA2, and the third region DA3 become larger in this order (D1<D2<D3).

A step portion DA4, which is a boundary between the first region DA1 and the second region DA2, faces the one end 20a of the motor shaft 20 with an interval therebetween in the direction of the rotation axis X.

The lip seal RS1 includes the lip portion RS1a that is in elastic contact with the outer periphery of the motor shaft 20. When viewed from the direction of the rotation axis X, the lip seal RS1 has a ring shape. The lip portion RS1a is in contact with the outer periphery of the motor shaft 20 over the entire circumference in the circumferential direction around the rotation axis X.

The lip seal RS2 includes a lip portion RS2a that is in elastic contact with an outer periphery of the third region DA3 of the drive shaft DA. When viewed from the direction of the rotation axis X, the lip seal RS2 has a ring shape. The lip portion RS2a is in contact with the outer periphery of the motor shaft 20 over the entire circumference in the circumferential direction around the rotation axis X.

Here, the outer diameter D3 of the third region DA3 of the drive shaft DA is larger than an outer diameter of the motor shaft 20. Therefore, an inner diameter of the lip seal RS2 is larger than an inner diameter of the lip portion RS1a of the lip seal RS1.

Accordingly, in a cross-sectional view in the direction of the vertical line VL, a lowest contact point between the outer periphery of the third region DA3 and the lip portion RS2*a* is positioned lower than a lowest contact point between the outer periphery of the motor shaft 20 and the lip portion RS1*a*.

In the present embodiment, in a cross-sectional view along the direction of the vertical line VL, a lowest contact point between the outer periphery of the third region DA3 and the lip portion RS2*a* is positioned a height h below the lowest contact point between the outer periphery of the motor shaft 20 and the lip portion RS1*a*.

In FIG. 7, the lowest contact point between the lip portion RS1*a* and the outer periphery of the motor shaft 20 corresponds to the lowest point Pa1 of the contact-related portion of the lip seal RS1. The lowest contact point between the lip portion RS2*a* and the outer periphery of the third region DA3 corresponds to a lowest point Pa2 related to a contact of the lip seal RS2.

When the vehicle equipped with the power transmission device 1 is traveling, the motor shaft 20 and the drive shaft DA rotate about the rotation axis X. Therefore, the lip portions RS1*a* and RS2*a*, which are in contact with the outer peripheries of the motor shaft 20 and the drive shaft DA, slide on the outer peripheries of the motor shaft 20 and the drive shaft DA.

As described above, in the present embodiment, the oil OL stored in the space Sc (oil accumulation portion 9) is used for lubrication of at least the respective lip portions RS1*a* and RS2*a* of the lip seals RS1 and RS2. The lip seal RS1 constitutes a second lubricated member of the present invention.

In the present embodiment, in order to lubricate both the lip portions RS1*a* and RS2*a*, it is preferable that an oil surface 9U in the oil accumulation portion 9 of the oil OL stored in the space Sc is set to a position higher than at least the lowest point Pa1 of the lip portion RS1*a*. Further, it is preferable that the oil surface 9U be maintained at the position higher than the lowest point Pa1 of the lip portion RS1*a*.

Furthermore, the oil surface 9U is preferably positioned between the step portion DA4 and the one end 20*a* of the motor shaft 20 in the direction of the rotation axis X.

Here, the oil OL in the space Sc is discharged into the gear chamber Sb through the gap CL between the outer periphery of the motor shaft 20 and the outer periphery of the drive shaft DA (first region DA1).

Therefore, the oil surface 9U of the oil OL in the space Sc is at a height position that is at least approximately flush with a lower end of an opening of the motor shaft 20.

Here, the height of the oil surface 9U changes with a temperature change of the oil OL. For example, when a temperature of the oil OL becomes low, a volume of the oil OL becomes smaller than when the temperature is high, and as a result, the height of the oil surface 9U becomes lower.

In other words, depending on a degree of reduction in height of the oil surface 9U, for example, the lip portion RS1*a* of the lip seal RS1 may be positioned at a position exposed above the oil surface 9U. When the vehicle starts to travel in this state, there is a possibility that the lip portion RS1*a*, which is in elastic contact with the outer periphery of the motor shaft 20, will cause a friction against the rotation of the motor shaft 20.

Here, an amount of change in height of the oil surface 9U corresponds to a shape of the space Sc that stores the oil OL. Therefore, in the present embodiment, in order to prevent the change in height of the oil OL in the space Sc, the shape of the space Sc is devised to have a feature in the shape (oil accumulation portion) of the oil OL stored in the space Sc.

Hereinafter, the first cover 7 and the second cover 8 forming the space Sc will be described.

Figure 8:
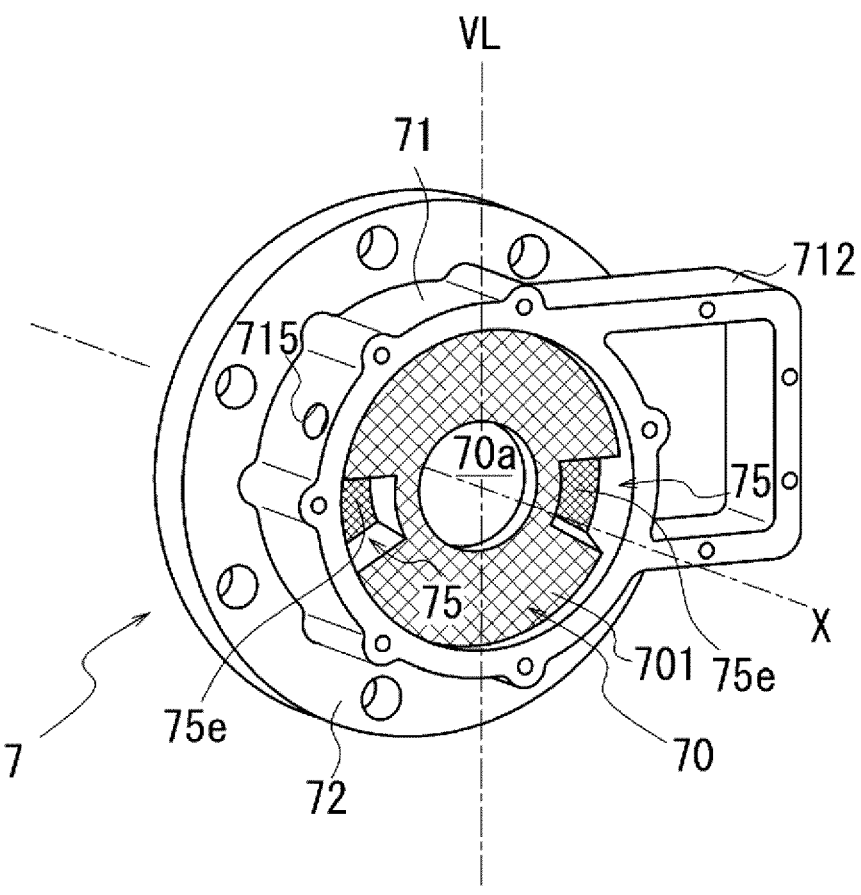
FIG. 8 is a view illustrating a first cover.

FIG. 8 is a view illustrating the first cover 7. FIG. 8 is a perspective view of the first cover 7 when viewed from the second cover 8 side. In FIG. 8, in order to make positions of the wall portion 70 and concave portions 75 easier to see, the wall portion 70 and portions of bottom surfaces 75*e* of the concave portions 75 are cross-hatched.

Figure 9:
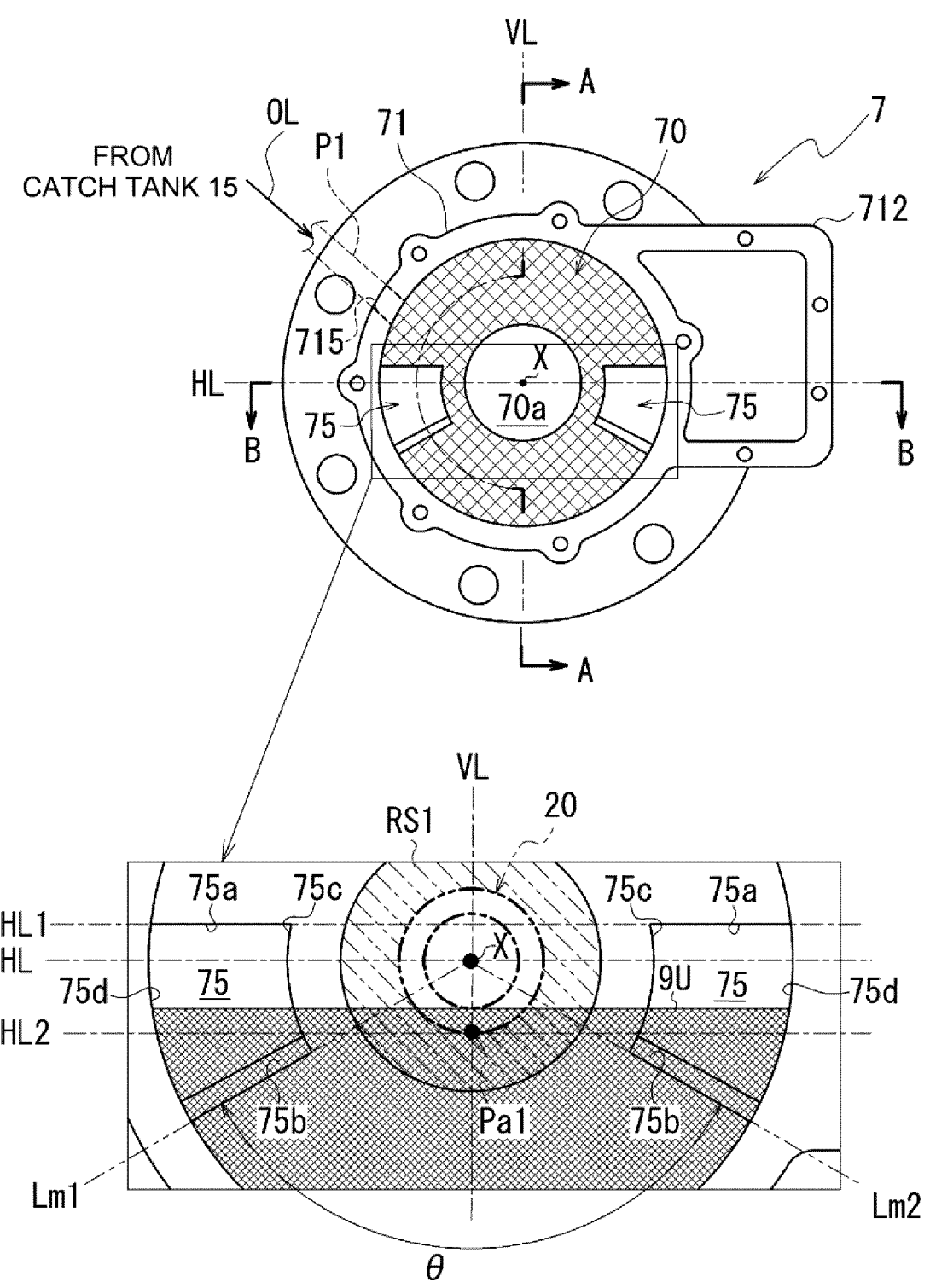
FIG. 9 shows views illustrating the first cover.

FIG. 9 show views illustrating the first cover 7. FIG. 9 is a front view of the first cover 7 when viewed from the second cover 8 side. In FIG. 9, in order to facilitate the viewing of the position of the wall portion 70, the wall portion 70 is cross-hatched. In an enlarged view of FIG. 9, a region in which the motor shaft 20 and the lip seal RS1 are disposed is indicated by a virtual line. Further, a region in which the oil OL is stored is cross-hatched.

Figure 10:
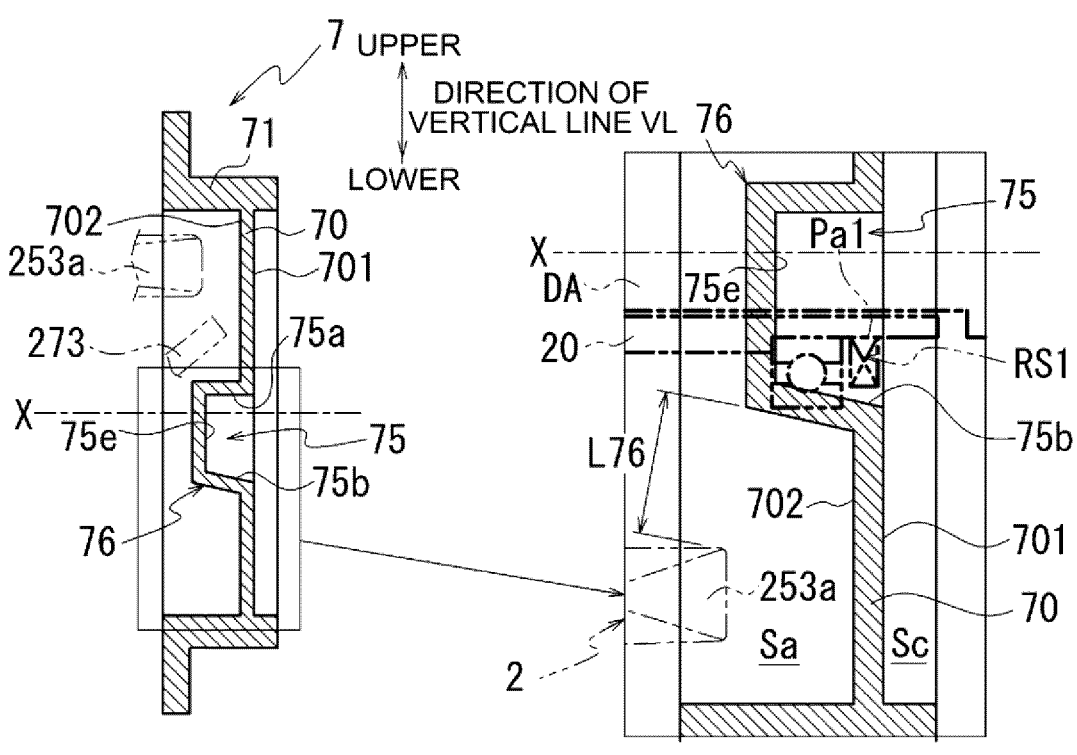
FIG. 10 shows views illustrating the first cover.

FIG. 10 shows views illustrating the first cover 7. FIG. 10 shows a schematic view of a cross section taken along a line A-A in FIG. 9. In FIG. 10, the motor 2 is indicated by a virtual line.

Figure 11:
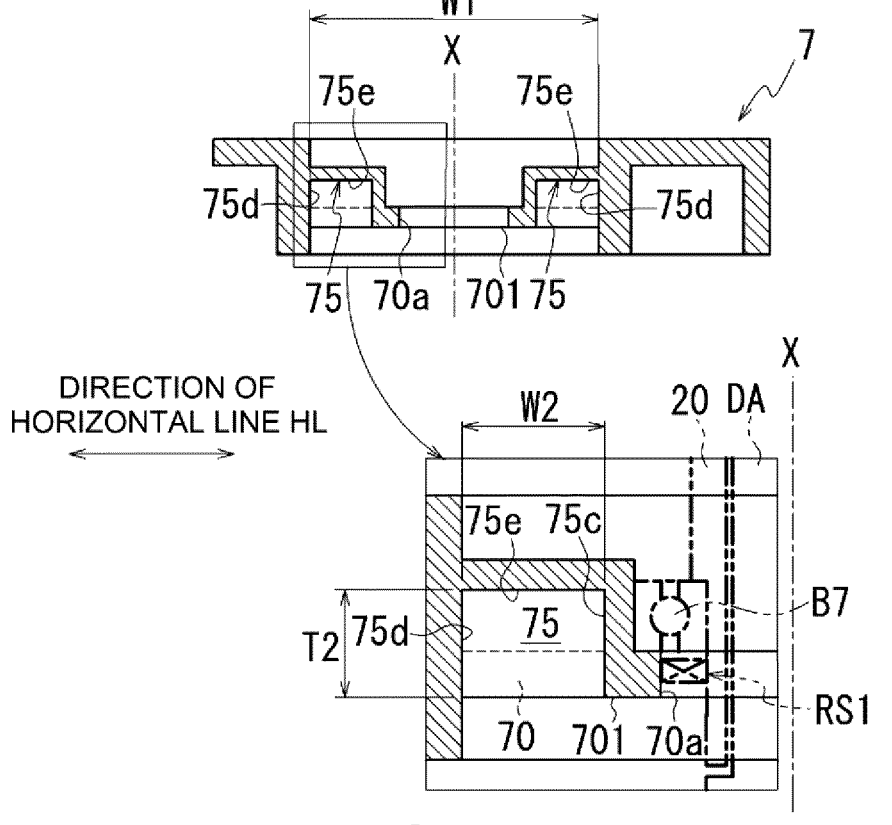
FIG. 11 shows views illustrating the first cover.

FIG. 11 shows views illustrating the first cover 7. FIG. 11 shows a schematic view of a cross section taken along a line B-B in FIG. 9.

In respective enlarged views of FIGS. 10 and 11, the drive shaft DA, the motor shaft 20, the lip seal RS1, and the bearing B7 are indicated by virtual lines, respectively.

(First Cover 7)

As shown in FIGS. 8 and 9, the substantially circular wall portion 70 is exposed on a surface of the first cover 7 on the second cover 8 side. The peripheral wall portion 71 is provided to surround an outer peripheral edge of the wall portion 70. The peripheral wall portion 71 protrudes from the wall portion 70 toward the second cover 8.

The peripheral wall portion 71 is provided with the oil hole 715. The oil hole 715 penetrates the peripheral wall portion 71 in a thickness direction. The pipe P1 extending from the catch tank 15 is connected to the oil hole 715 (see FIG. 9).

A box portion 712 is provided on a side opposite to the oil hole 715 with the vertical line VL interposed therebetween.

As shown in FIG. 9, two concave portions 75, 75 are formed in the wall portion 70. The concave portions 75, 75 are provided to extend the space Sc formed between the first cover 7 and the second cover 8 in the direction of the rotation axis X. The concave portions 75, 75 are formed by recessing a part of the wall portion 70 toward a rear side of the paper (motor 2 side in the direction of the rotation axis X).

As shown in FIG. 9, when viewed from the direction of the rotation axis X, the concave portions 75, 75 are respectively provided on one side and the other side of the vertical line VL passing through the rotation axis X.

As shown in FIG. 9, when viewed from the direction of the rotation axis X, the two concave portions 75, 75 have shapes symmetrical with respect to the vertical line VL. The concave portions 75, 75 form an arc shape surrounding the insertion hole 70*a*.

As shown in the enlarged view of FIG. 9, when viewed from the direction of the rotation axis X, the lowest point Pa1 is a lower apex of a contact portion between the lip seal RS1 and the outer periphery of the motor shaft 20. The concave portions 75, 75 are provided in a range that crosses a horizontal line HL2 passing through the lowest point Pa1 from the upper side to the lower side in the direction of the vertical line VL when viewed from the direction of the rotation axis X.

Specifically, each of the concave portions 75 includes an upper surface 75a positioned above the horizontal line HL passing through the rotation axis X, and a lower surface 75b positioned below the horizontal line HL. Further, the concave portion 75 includes an inner peripheral surface 75c connecting end portions of the upper surface 75a and the lower surface 75b on the inner diameter side, and an outer peripheral surface 75d connecting end portions of the upper surface 75a and the lower surface 75b on the outer diameter side when viewed from the direction of the rotation axis X.

As shown in FIG. 9, the upper surface 75a is provided in a direction along a horizontal line HL1 passing above the horizontal line HL. The lower surface 75b is provided in a direction along a radial line Lm1 passing through the rotation axis X on the one side (left side in the figure) of the vertical line VL, and is provided in a direction along a radial line Lm2 passing through the rotation axis X on the other side (right side in the figure). In the circumferential direction around the rotation axis X, an angle formed by the radial line Lm1 and the radial line Lm2 is 0. The inner peripheral surface 75c and the outer peripheral surface 75d are curved in the circumferential direction around the rotation axis X.

The inner peripheral surface 75c and the outer peripheral surface 75d are provided in a range that crosses the horizontal line HL2 passing through the lowest point Pa1 from the upper side to the lower side in the direction of the vertical line VL.

As shown in FIG. 10, the wall portion 70 separates the motor chamber Sa from the space Sc in the direction of the rotation axis X. When viewed from the radial direction of the rotation axis X, the concave portion 75 is recessed from the wall portion 70 toward the motor chamber Sa. The concave portion 75 includes the bottom surface 75e connecting end portions of the upper surface 75a and the lower surface 75b on a motor chamber Sa side. The bottom surface 75e is a flat surface orthogonal to the rotation axis X. The lower surface 75b is inclined upward in the direction of the vertical line VL while approaching the bottom surface 75e from the wall portion 70 in the direction of the rotation axis X. That is, the lower surface 75b is inclined upward in the direction of the vertical line VL while approaching the motor 2 in the direction of the rotation axis X.

As shown in FIG. 11, the bottom surface 75e is offset in the direction of the rotation axis X by a distance T2 from a side surface 701 of the wall portion 70 on a space Sc side. The inner peripheral surface 75c and the outer peripheral surface 75d face each other with an interval W2 therebetween in the radial direction of the rotation axis X.

When viewed from the direction of the vertical line VL, the drive shaft DA, the motor shaft 20, the lip seal RS1, and the concave portion 75 overlap with one another in the horizontal line HL direction (left-right direction in FIG. 11).

As shown in FIG. 10, when viewed from the radial direction of the rotation axis X, the lowest point Pa1 in the contact portion between the lip seal RS1 and the motor shaft 20 is provided at a position overlapping with the concave portion 75.

The concave portion 75 is formed by recessing the part of the wall portion 70 toward the motor chamber Sa. When viewed from the motor chamber Sa side, a portion of the wall portion 70 in which the concave portion 75 is provided constitutes a convex portion 76 protruding toward the motor chamber Sa. When viewed from the radial direction of the rotation axis X, the convex portion 76 is positioned on an inner diameter side of the coil end 253a.

Here, as shown in FIG. 10, the connector portion 273 of the sensor 27 is provided in the motor chamber Sa (see a virtual line in the figure). The connector portion 273 is provided on the inner diameter side of the coil end 253a and is positioned above the rotation axis X in the direction of the vertical line VL. Therefore, a space of the coil end 253a on the inner diameter side is narrowed in a region around the connector portion 273. On the other hand, in a region in which the connector portion 273 is not provided, the space of the coil end 253a on the inner diameter side is wide.

The convex portion 76 is provided at a position avoiding the connector portion 273 when viewed from the radial direction of the rotation axis X, and effectively uses the space of the coil end 253a on the inner diameter side.

In the motor chamber Sa, a clearance between the wall portion 70 and the coil end 253a is the narrowest in the region where the convex portion 76 is provided. A shortest distance between the convex portion 76 and the coil end 253a is L76. The shortest distance L76 is set to a distance that maintains insulation.

Figure 12:
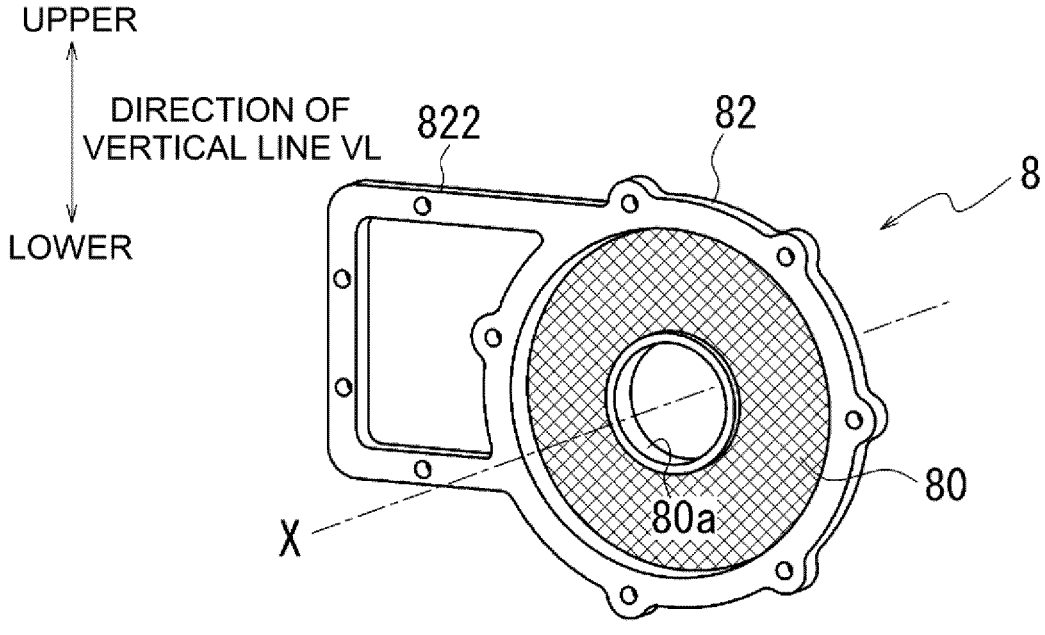
FIG. 12 is a view illustrating a second cover.

FIG. 12 is a view illustrating the second cover 8. FIG. 12 is a perspective view of the second cover 8 when viewed from the first cover 7 side.

Figure 13:
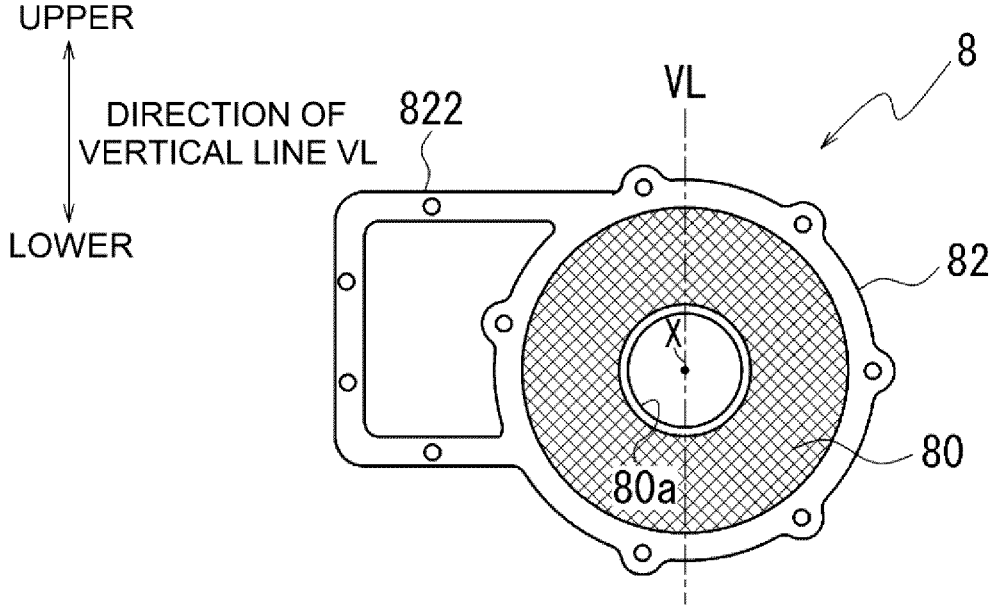
FIG. 13 is a view illustrating the second cover.

FIG. 13 is a view illustrating the second cover 8. FIG. 13 is a front view of the second cover 8 when viewed from the first cover 7 side. In FIGS. 12 and 13, in order to facilitate viewing of a region of the wall portion 80, the wall portion 80 is cross-hatched.

(Second Cover 8)

As shown in FIG. 12, the second cover 8 is provided with the joining portion 82 on an outer peripheral side of the wall portion 80. The joining portion 82 is provided with a plate-shaped lid portion 822. The lid portion 822 is formed integrally with the joining portion 82. The lid portion 822 bulges outward in the radial direction from the joining portion 82. As shown in FIG. 13, the lid portion 822 is provided on the other side (left side in the figure) of the vertical line VL passing through the rotation axis X.

Figure 14:
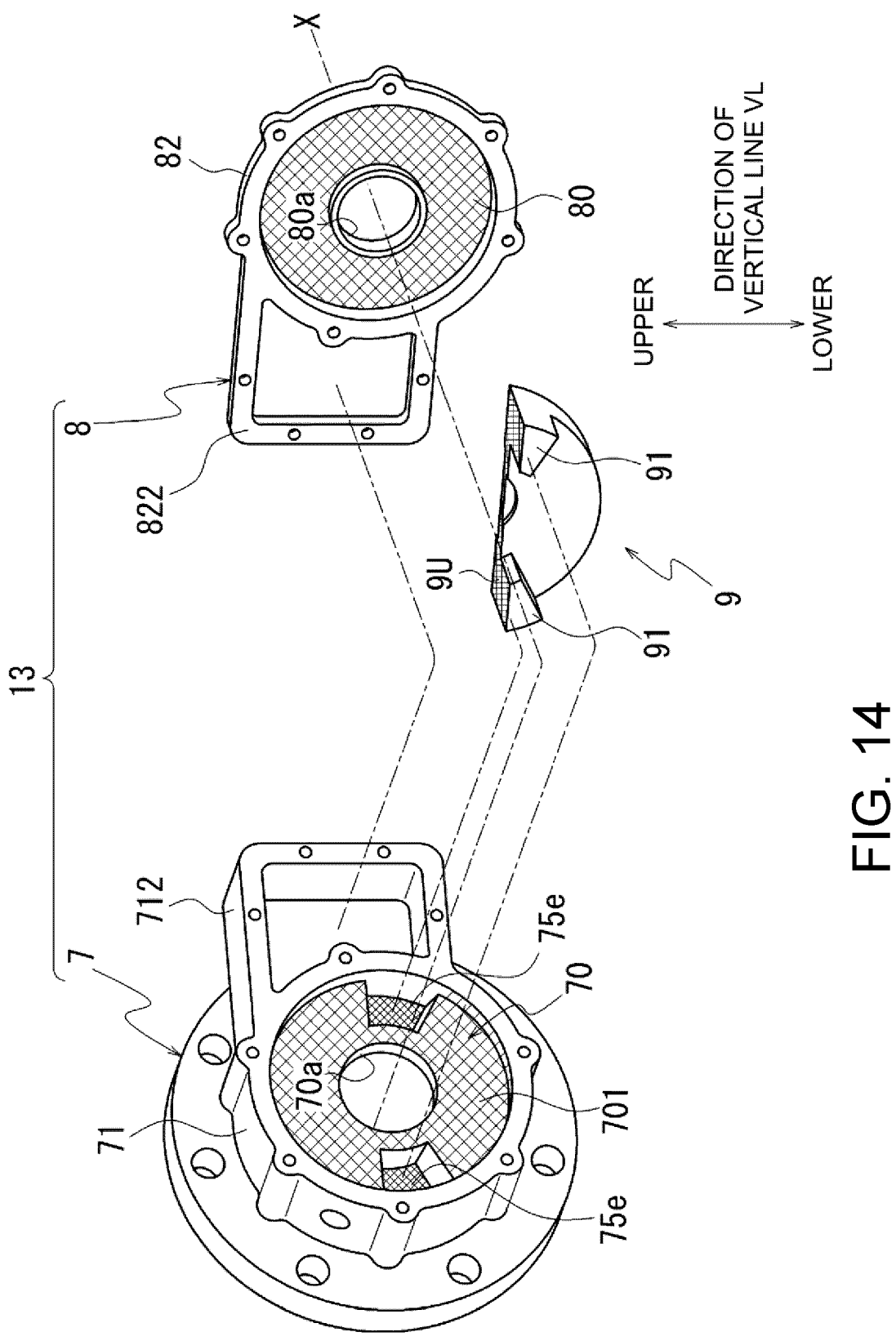
FIG. 14 is an exploded perspective view of the cover member.

FIG. 14 is an exploded perspective view of the cover member 13.

Figure 15:
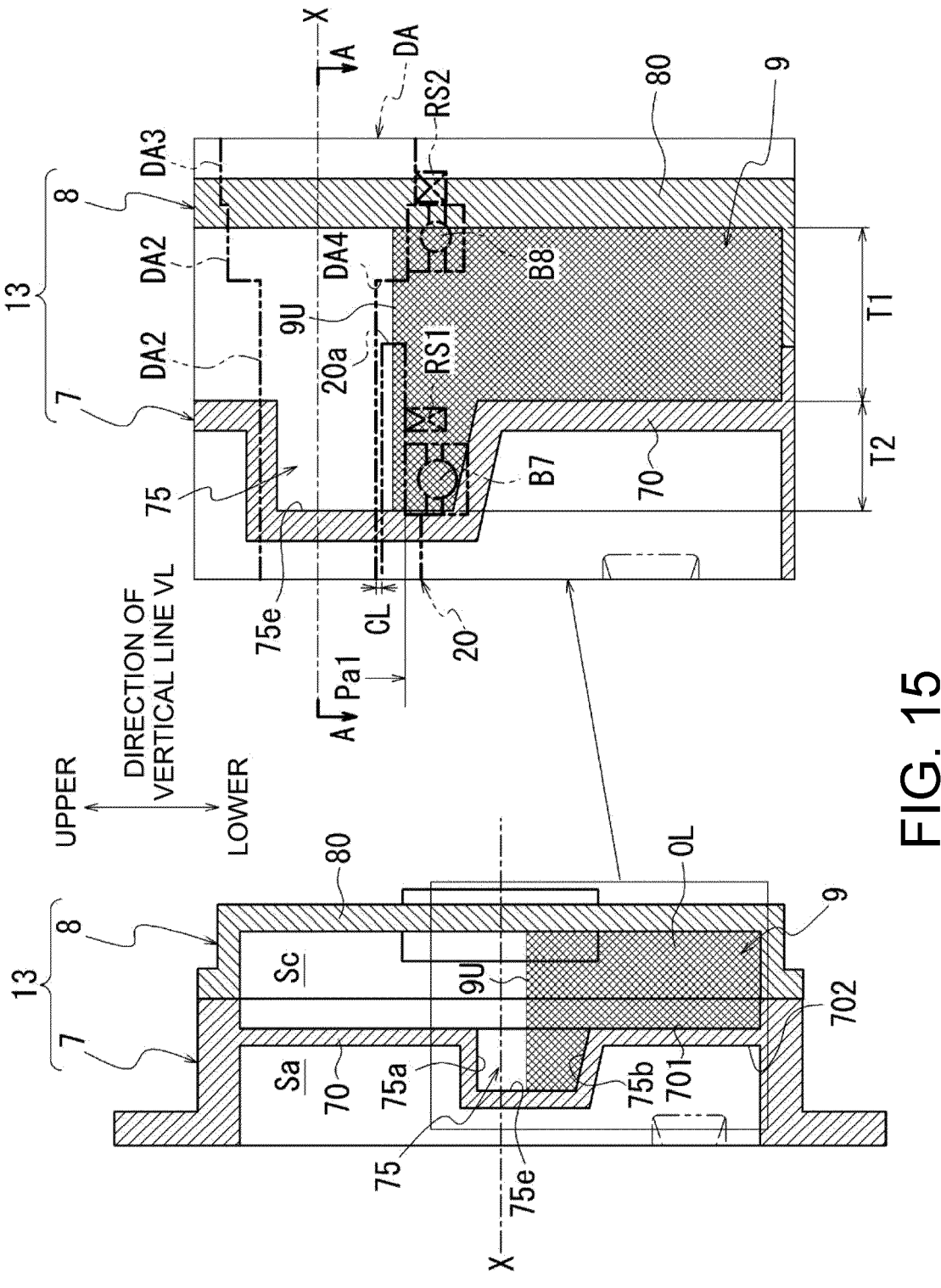
FIG. 15 shows views illustrating an oil surface of an oil accumulation portion.

FIG. 15 shows views illustrating the oil surface 9U of the oil accumulation portion 9. FIG. 15 is a schematic view of a cross section obtained by cutting a region around the concave portion 75 in the cover member 13. In FIG. 15, cross-hatching is given to clarify a range of the oil OL stored in the space Sc.

Figure 16:
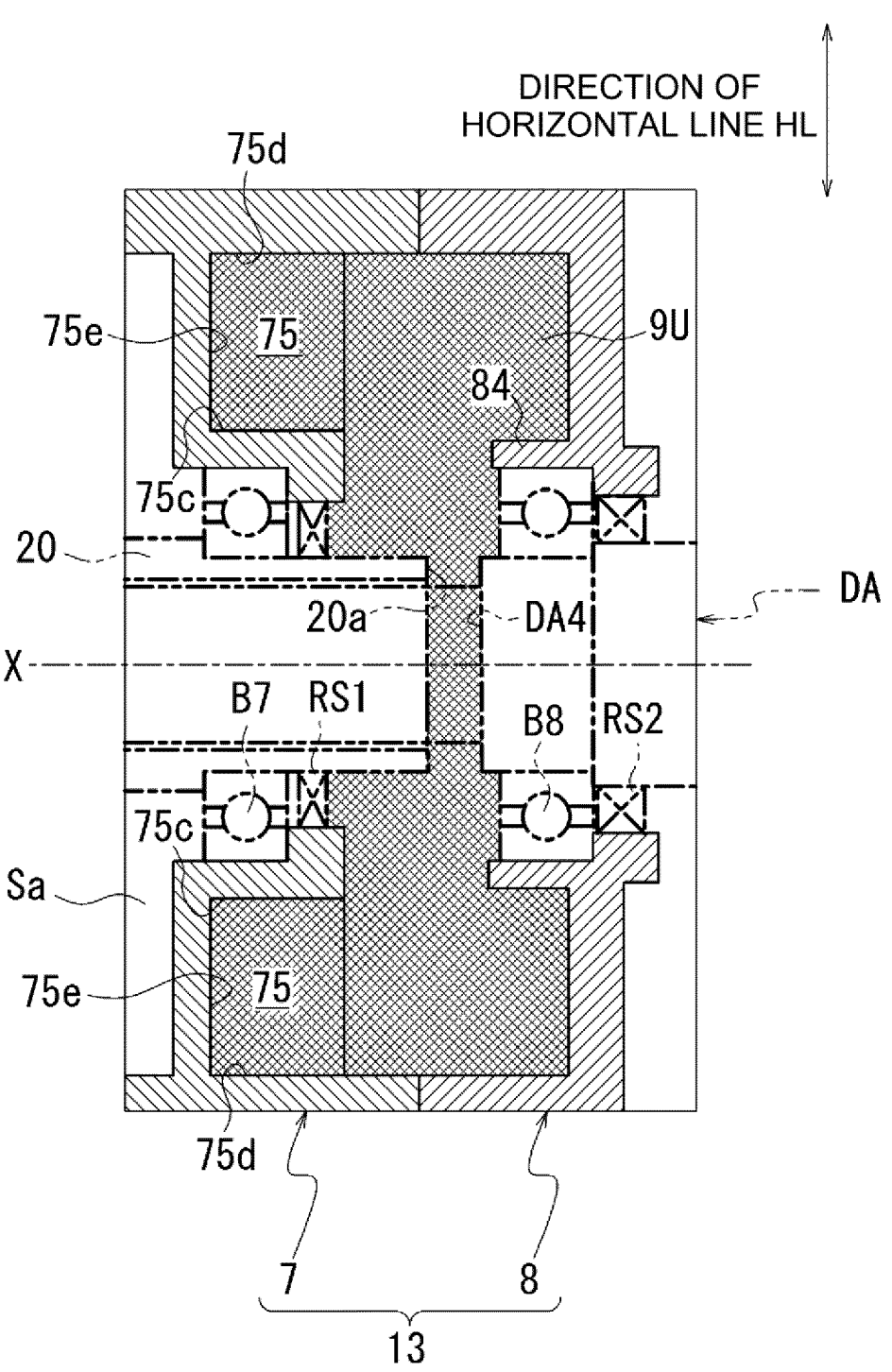
FIG. 16 is a view illustrating the oil surface of the oil accumulation portion.

FIG. 16 is a view illustrating a shape when the oil surface 9U of the oil accumulation portion 9 is viewed from above. FIG. 16 is a view schematically showing a cross section taken along a line A-A in FIG. 15. In FIG. 16, a region corresponding to the oil surface 9U is cross-hatched.

In FIGS. 15 and 16, in order to illustrate positional relations between the drive shaft DA, the motor shaft 20, the lip seals RS1 and RS2, the bearings B7 and B8, and the oil surface 9U, the drive shaft DA, the motor shaft 20, the lip seals RS1 and RS2, and the bearings B7 and B8 are indicated by virtual lines, respectively.

As shown in FIG. 14, the joining portion 82 of the second cover 8 is joined to the peripheral wall portion 71 of the first cover 7 from the direction of the rotation axis X. The lid portion 822 of the second cover 8 is joined to the box portion 712 of the first cover 7 from the direction of the rotation axis X. Accordingly, the insertion hole 70a of the first cover 7 and the insertion hole 80a of the second cover 8 are concentrically arranged on the rotation axis X. An opening of the box portion 712 of the first cover 7 is closed by the lid portion 822 of the second cover 8.

As shown in FIG. 15, when the first cover 7 and the second cover 8 are joined, the space Sc is formed between the wall portion 80 and the wall portion 70 in the direction of the rotation axis X. The space Sc is such that a region in which the concave portion 75 is provided is wider in the direction of the rotation axis X than a region in which the concave portion 75 is not provided.

Specifically, in the region in which the concave portion 75 is not provided, a length of the space Sc in the direction of the rotation axis X is an interval T1 between the wall portion 70 and the wall portion 80. In the region in which the concave portion 75 is provided, the length of the space Sc in the direction of the rotation axis X is an interval (T1+T2) between the bottom surface 75e of the concave portion 75 and the wall portion 80. That is, only the region in which the concave portion 75 is provided is longer by a length T2.

The gap CL between the inner periphery of the motor shaft 20 and the outer periphery of the drive shaft DA serves as a discharge passage of the oil OL from the space Sc. Therefore, in the direction of the vertical line VL with reference to an installation state of the power transmission device 1 on the vehicle, the oil surface 9U of the oil accumulation portion 9 is positioned above the lowest point Pa1 in the contact portion between the lip seal RS1 and the outer periphery of the motor shaft 20.

That is, a part of the oil surface 9U is accommodated in the concave portion 75. Therefore, the oil accumulation portion 9 has a shape in which an oil surface 9U side, which is a region above the direction of the vertical line VL, has a thickness in the direction of the rotation axis X with respect to a lower side region. In the concave portion 75, the oil accumulation portion 9 has a shape following the bottom surface 75e and the lower surface 75b.

Here, when viewed from the radial direction (horizontal line direction) of the rotation axis X, the concave portion 75 is provided in a positional relation in which the concave portion 75 overlaps with the lip seals RS1, RS2 and the bearings B7, B8. Therefore, when the oil OL is stored in the concave portion 75, the lip seals RS1 and RS2 and the bearings B7 and B8 are submerged in the stored oil OL.

As shown in FIG. 16, when viewed from above in the direction of the vertical line VL, the oil surface 9U has a shape in the concave portion 75 that follows the inner peripheral surface 75c, the bottom surface 75e, and the outer peripheral surface 75d.

Further, the oil surface 9U crosses between the one end 20a of the motor shaft 20 and the step portion DA4 of the drive shaft DA in the direction of the horizontal line HL orthogonal to the rotation axis X, and spans the concave portion 75 on the one side and the concave portion 75 on the other side of the rotation axis X. Heights of the oil surface 9U accommodated in the two concave portions 75, 75 are the same (see FIG. 15).

In FIG. 14, the shape of the oil OL stored in the space Sc between the wall portion 70 of the first cover 7 and the wall portion 80 of the second cover 8 is schematically shown as a shape of the oil accumulation portion 9.

The oil accumulation portion 9 includes a base portion 90 corresponding to the shape of the oil OL stored in a lower portion in the space Sc, and enlarged portions 91, 91 corresponding to the shapes of the oil OL flowing into the concave portions 75, 75 of the first cover 7.

In the oil accumulation portion 9, regions accommodated in the concave portions 75, 75 is thicker in the direction of the rotation axis X than the other regions. That is, the oil accumulation portion 9 includes the enlarged portions 91, 91 in each of which an upper side thereof in the direction of the vertical line VL is thicker than a lower side in the direction of the rotation axis X.

Figure 17:
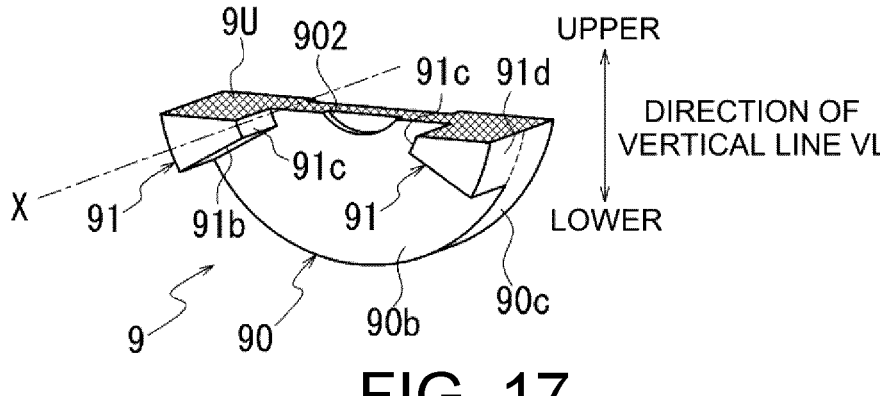
FIG. 17 is a view illustrating the oil accumulation portion.
Figure 18:
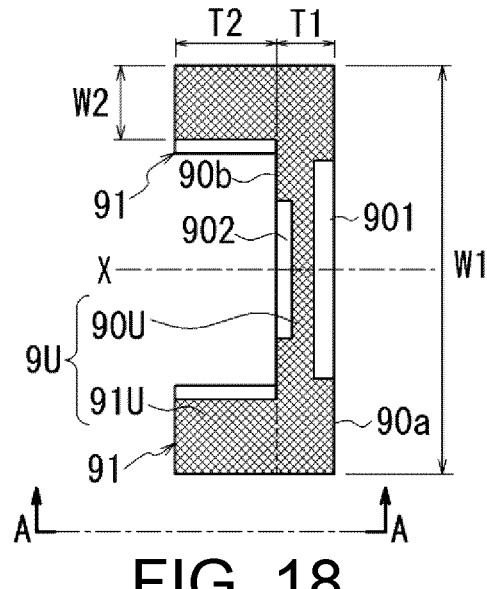
FIG. 18 is a view illustrating the oil accumulation portion.
Figure 19:
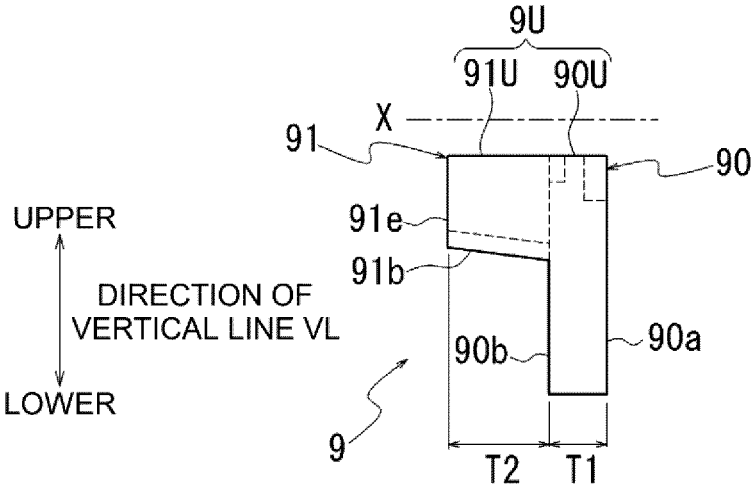
FIG. 19 is a view illustrating the oil accumulation portion.

FIGS. 17 to 19 are views illustrating the oil accumulation portion 9.

FIG. 17 is a perspective view of the oil accumulation portion 9. FIG. 17 is a view of the oil accumulation portion 9 viewed from the first cover 7 side in FIG. 14.

FIG. 18 is a top view of the oil accumulation portion 9 in FIG. 17.

FIG. 19 is a side view of the oil accumulation portion 9 in FIG. 17.

In FIGS. 17 and 18, in order to facilitate viewing of a range of the oil surface 9U, the oil surface 9U is cross-hatched.

As shown in FIG. 17, the oil accumulation portion 9 includes the substantially semicircular plate-shaped base portion 90 and the two enlarged portions 91, 91 extending from the base portion 90 in the direction of the rotation axis X.

As shown in FIG. 19, an upper surface 90U of the base portion 90 in the direction of the vertical line VL is a flat surface orthogonal to the vertical line VL. One surface 90a and the other surface 90b of the base portion 90 in the direction of the rotation axis X are flat surfaces orthogonal to the rotation axis X. The one surface 90a of the base portion 90 faces the wall portion 80 (see FIG. 14) of the second cover 8. The other surface 90b of the base portion 90 faces the wall portion 70 (see FIG. 14) of the first cover 7.

As shown in FIG. 18, when viewed from above in the direction of the vertical line VL, the one surface 90a of the base portion 90 has a concave portion 901 opens in a center in the radial direction of the rotation axis X. The concave portion 901 is a recess corresponding to a shape of the peripheral wall portion 84 (see FIG. 16) of the second cover 8. The other surface 90b of the base portion 90 has a concave portion 902 that opens in a center in the radial direction of the rotation axis X. The concave portion 902 is a recess corresponding to a shape of the motor shaft 20 on the one end 20a (see FIG. 16) side.

As shown in FIG. 18, the enlarged portions 91, 91 are positioned on the other surface 90b of the base portion 90. The enlarged portions 91, 91 are positioned at both end portions of the base portion 90 in the radial direction of the rotation axis X.

As shown in FIG. 19, the enlarged portions 91, 91 extend in a direction away from the base portion 90 in the direction of the rotation axis X. A tip surface 91e of the enlarged portion 91 in the direction of the rotation axis X is a contact surface with the bottom surface 75e (see FIG. 10) of the concave portion 75.

As shown in FIG. 17, when viewed from the direction of the rotation axis X, the enlarged portions 91 and 91 form an arc shape surrounding the rotation axis X.

The enlarged portion 91 includes an inner peripheral surface 91c and an outer peripheral surface 91d along the circumferential direction around the rotation axis X. The enlarged portion 91 includes an upper surface 91U (see FIG. 18) and a lower surface 91b that connect end portions of the inner peripheral surface 91c and the outer peripheral surface 91d to each other. The inner peripheral surface 91c, the outer peripheral surface 91d, and the lower surface 91b are contact surfaces with the inner peripheral surface 75c, the outer peripheral surface 75d, and the lower surface 75b of the concave portion 75, respectively (see FIGS. 10 and 11).

As shown in FIG. 18, the upper surface 91U of the enlarged portion 91 is a flat surface orthogonal to the vertical line VL. The upper surface 91U of the enlarged portion 91 is flush with the upper surface 90U of the base portion 90. The upper surface 91U of the enlarged portion 91 and the upper surface 90U of the base portion 90 constitute the oil surface 9U of the oil accumulation portion 9. As shown in FIG. 17, the outer peripheral surface 91d of the enlarged portion 91 is flush with the outer peripheral surface 90c of the base portion 90.

As shown in FIG. 19, a thickness of the base portion 90 in the direction of the rotation axis X is T1. The thickness T1 of the base portion 90 matches the interval between the wall portion 70 of the first cover 7 and the wall portion 80 of the second cover 8 in the direction of the rotation axis X (see FIG. 15). Further, a thickness of the enlarged portion 91 in the direction of the rotation axis X is T2. The thickness T2 of the enlarged portion 91 matches the distance T2 from the side surface 701 of the wall portion 70 to the bottom surface 75e of the concave portion 75 in the direction of the rotation axis X (see FIG. 11).

As shown in FIG. 18, a width of the base portion 90 in the radial direction of the rotation axis X is W1. The width W1 of the base portion 90 matches an interval W1 between the outer peripheral surface 75d of the concave portion 75 on the one side and the outer peripheral surface 75d of the concave portion 75 on the other side of the rotation axis X (see FIG. 11). Further, a width of the enlarged portion 91 in the radial direction of the rotation axis X is W2. The width W2 of the enlarged portion 91 matches the interval W2 between the inner peripheral surface 75c and the outer peripheral surface 75d of the concave portion 75 (see FIG. 11).

Functions of the power transmission device 1 having such a configuration will be described.

As shown in FIG. 1, in the power transmission device 1, the planetary reduction gear 4, the differential mechanism 5, and the drive shafts DA and DB are provided along the transmission path of the output rotation of the motor 2.

As shown in FIG. 2, when the motor 2 is driven and the rotor core 21 rotates about the rotation axis X, the rotation is input to the sun gear 41 (see FIG. 3) of the planetary reduction gear 4 via the motor shaft 20 that rotates integrally with the rotor core 21.

In the planetary reduction gear 4, the sun gear 41 serves as an input portion for the output rotation of the motor 2, and the differential case 50 supporting the stepped pinion gear 43 serves as an output portion for the input rotation.

As shown in FIG. 3, when the sun gear 41 rotates around the rotation axis X by the input rotation, the stepped pinion gear 43 (large-diameter gear portion 431 and small-diameter gear portion 432) rotates around the axis X1 by the rotation input from the sun gear 41.

Here, the small-diameter gear portion 432 of the stepped pinion gear 43 meshes with the ring gear 42 fixed to an inner periphery of the gear case 14. Therefore, the stepped pinion gear 43 revolves around the rotation axis X while rotating around the axis X1.

Here, in the stepped pinion gear 43, an outer diameter of the small-diameter gear portion 432 is smaller than an outer diameter of the large-diameter gear portion 431.

Accordingly, the differential case 50 supporting the stepped pinion gear 43 rotates around the rotation axis X at a rotation speed lower than that of the rotation input from the motor 2.

Therefore, the rotation input to the sun gear 41 of the planetary reduction gear 4 is greatly decelerated by the stepped pinion gear 43 and then output to the differential case 50 (differential mechanism 5).

As shown in FIG. 2, when the differential case 50 rotates around the rotation axis X by the input rotation, the drive shafts DA and DB meshing with the pinion mate gear 52 rotate around the rotation axis X in the differential case 50.

Accordingly, the left and right drive wheels W, W (see FIG. 1) of the vehicle equipped with the power transmission device 1 are rotated by the transmitted rotational driving force.

The oil OL for lubrication is stored inside the gear chamber Sb. In the gear chamber Sb, when the output rotation of the motor 2 is transmitted, the oil OL stored in the gear chamber Sb is raked up by the differential case 50 rotating about the rotation axis X.

As shown in FIGS. 3 and 4, a meshing portion between the sun gear 41 of the planetary reduction gear 4 and the large-diameter gear portion 431 and the meshing portion between the small-diameter gear portion 432 and the ring gear 42 are lubricated by the raked oil OL. Further, meshing portions of the pinion mate gear 52 of the differential mechanism 5 and the side gears 54A, 54B are lubricated by the raked oil OL.

That is, the planetary reduction gear 4 constitutes a first lubricated member. The lowest point Pb in the meshing portion between the small-diameter gear portion 432 and the ring gear 42 is a lowest point on a lower side in a gravity direction of a lubrication target location of the first lubricated member (see FIG. 6).

As shown in FIG. 5, the differential case 50 rotates in a clockwise direction CW around the rotation axis X.

The catch tank 15 is provided on an upper portion of the gear case 14. The catch tank 15 is positioned downstream in the rotation direction of the differential case 50, and the part of the oil OL raked up by the differential case 50 flows into the catch tank 15.

As shown in FIG. 4, the part of the oil OL flowing into the catch tank 15 is supplied to a space Rx between the lip seal RS and the bearing B2 via an oil passage 151a to lubricate the bearing B2.

As shown in FIG. 6, a part of the oil OL flowing into the catch tank 15 is supplied to the space Sc of the cover member 13 via the pipe P1. The part of the oil OL supplied to the space Sc accumulates in a lower portion of the space Sc to form the oil accumulation portion 9. The part of the oil OL in the space Sc is returned from the gap CL between the motor shaft 20 and the drive shaft DA to the gear chamber Sb.

Figure 20:
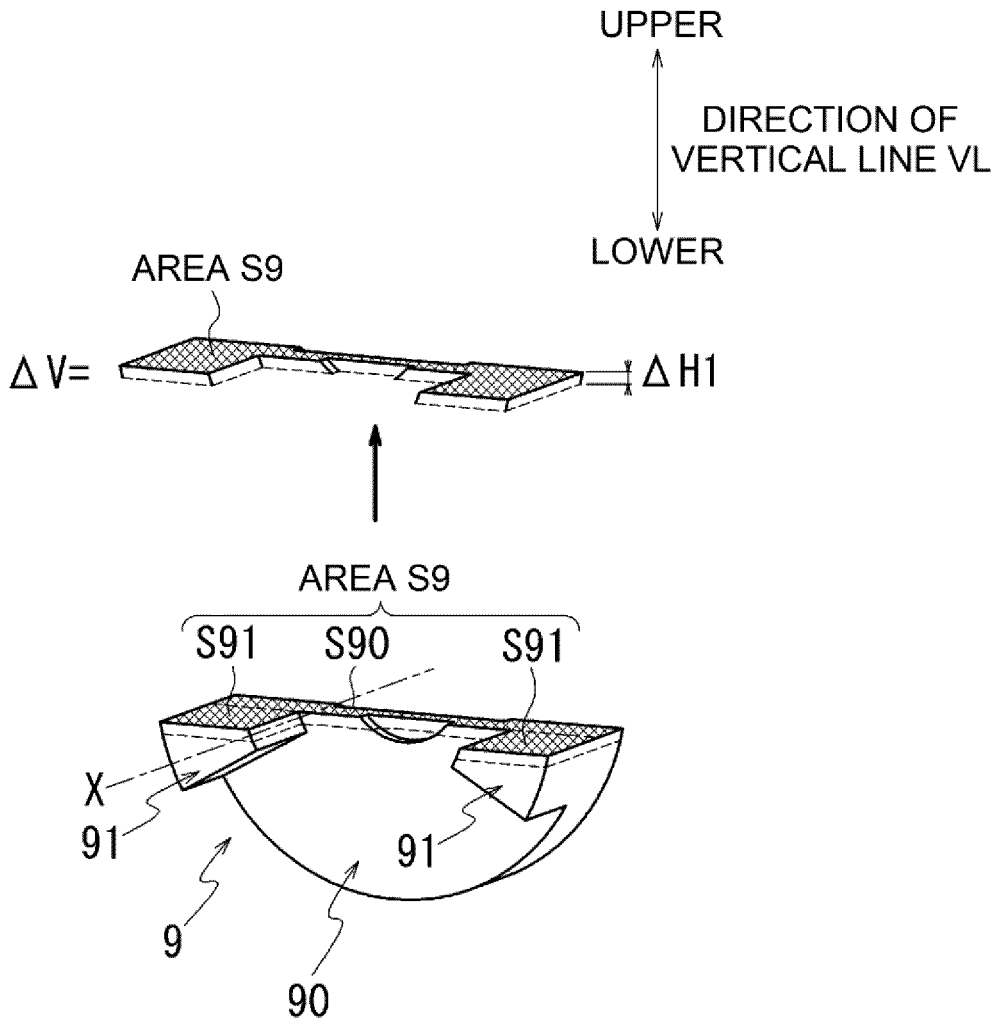
FIG. 20 is a view illustrating a decrease in volume of the oil accumulation portion.
Figures 21, 22:
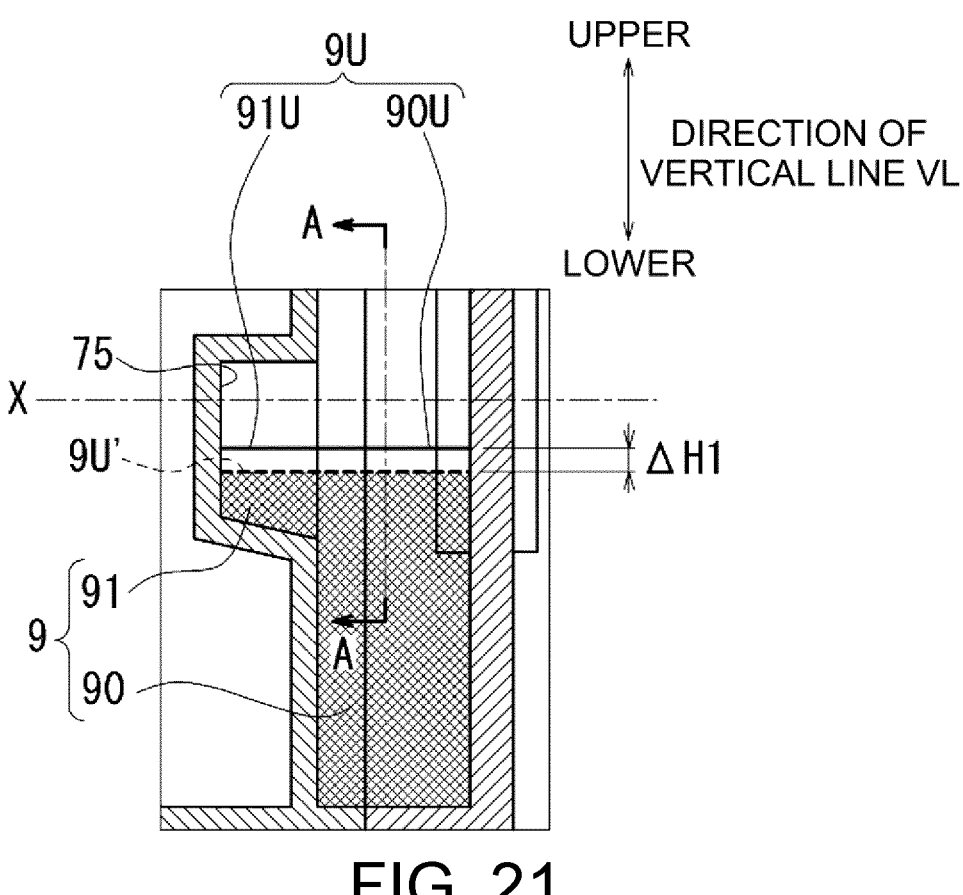
FIG. 21 is a view illustrating displacement of the oil surface of the oil accumulation portion.
FIG. 22 is a view illustrating the displacement of the oil surface of the oil accumulation portion.

FIGS. 20 to 22 are views illustrating a change in oil surface 9U of the oil accumulation portion 9.

FIG. 20 is a view illustrating a decrease in volume of the oil accumulation portion 9.

FIG. 21 is a view illustrating displacement of the oil surface 9U when viewed from the radial direction (horizontal line direction) of the rotation axis X.

FIG. 22 is a view illustrating displacement of the oil surface 9U when viewed from the direction of the rotation axis X. FIG. 22 is a view of the oil surface 9U in FIG. 21 when viewed from a direction of an arrow A-A. In FIG. 22, the lip seal RS1 and the motor shaft 20 are indicated by virtual lines. Further, the lip seal RS1 is hatched.

The volume of the oil OL varies with the temperature change. For example, when the temperature of the oil OL decreases due to a decrease in an outside air temperature, the volume of the oil OL also decreases. As a result, the oil surface 9U of the oil OL stored in the space Sc drops as the temperature decreases.

As shown in FIG. 20, a decrease amount $\Delta V$ of the volume of the oil accumulation portion 9 can be obtained by a product of an area S9 of the oil surface 9U and a displacement amount $\Delta H1$ in the direction of the vertical line VL ($\Delta V = S9 \times \Delta H1$).

Here, the decrease amount ΔV of the volume of the oil accumulation portion 9 caused by the decrease in temperature is constant. That is, as the area S9 of the oil surface increases, the displacement amount ΔH1 in the direction of the vertical line VL decreases.

As shown in FIG. 20, the area S9 of the oil surface 9U of the oil accumulation portion 9 is a sum of an area S90 of the upper surface 90U of the base portion 90 and areas S91 of the upper surface 91U of the enlarged portions 91 (S9=S90+2×S91).

As shown in FIG. 18, the area S90 of the upper surface 90U in the base portion 90 is a product of the width W1 in the radial direction of the rotation axis X and the thickness T1 in the direction of the rotation axis X (S90=W1×T1). Opening areas of the concave portion 901 and the concave portion 902 in the upper surface 90U are ignored.

The area S91 of the upper surface 91U in the enlarged portion 91 is a product of the width W2 in the radial direction of the rotation axis X and the thickness T2 in the direction of the rotation axis X (S91=W2×T2).

As shown in FIG. 21, the oil OL in the concave portion 75 is the enlarged portion 91 of the oil accumulation portion 9. When the temperature of the oil OL decreases in a state in which the oil OL is present in the concave portion 75, the height of the oil OL in the concave portion 75 decreases.

As a result, the height position of the oil accumulation portion 9 drops by only ΔH1 from the oil surface 9U in the direction of the vertical line VL to an oil surface 9U′ (see the broken line in the figure).

In the oil accumulation portion 9 according to the present embodiment, the area of the oil surface 9U is a sum of the area S90 of the base portion 90 and the areas S91 of the enlarged portion 91, so that the position of the oil surface 9U is lowered by ΔH1.

Accordingly, as shown in FIG. 22, the oil surface 9U′ after the lowering can be maintained above the horizontal line HL2. The horizontal line HL2 is a horizontal line passing through the lowest point Pa1 in the contact portion between the lip seal RS1 and the motor shaft 20.

Accordingly, the state in which the contact portion between the motor shaft 20 and the lip seal RS1 is immersed in the oil OL can be maintained.

Hereinafter, in order to describe advantages of the enlarged portions 91, 91 of the oil accumulation portion 9 according to the present embodiment, an oil accumulation portion 900 not including the enlarged portions 91, 91 will be described as a comparative example.

The following description is based on the following assumptions. The oil accumulation portion 900 according to the comparative example has the same volume as the oil accumulation portion 9 according to the present embodiment, and is set to the same temperature. In the following comparative example, only portions different from the present embodiment will be described.

Figures 23, 24:
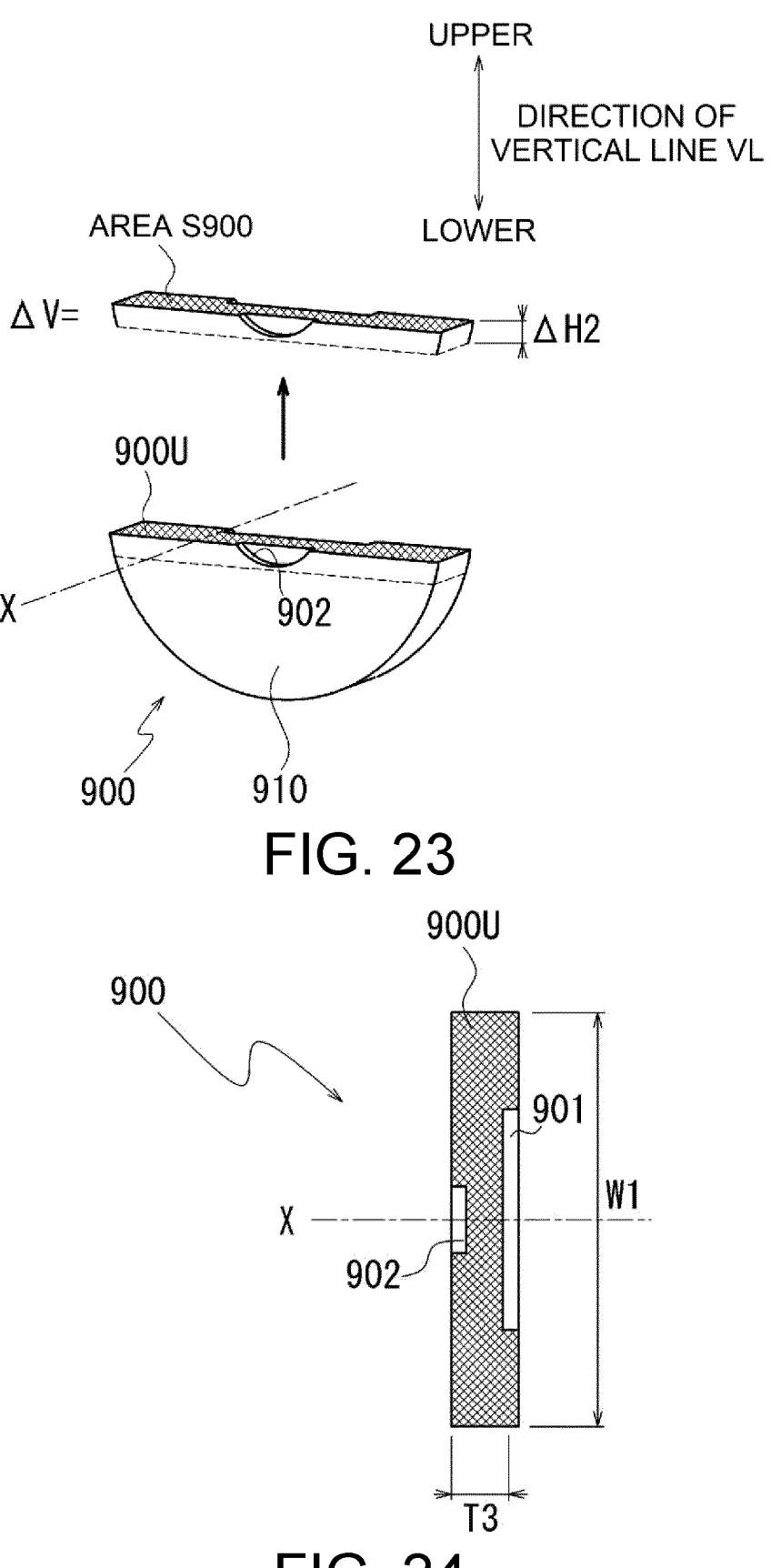
FIG. 23 is a view illustrating an oil accumulation portion according to a comparative example.
FIG. 24 is a view illustrating the oil accumulation portion according to the comparative example.

FIG. 23 is a view illustrating the oil accumulation portion 900 according to the comparative example.

FIG. 24 is a top view illustrating the oil accumulation portion 900 according to the comparative example.

Figure 25:
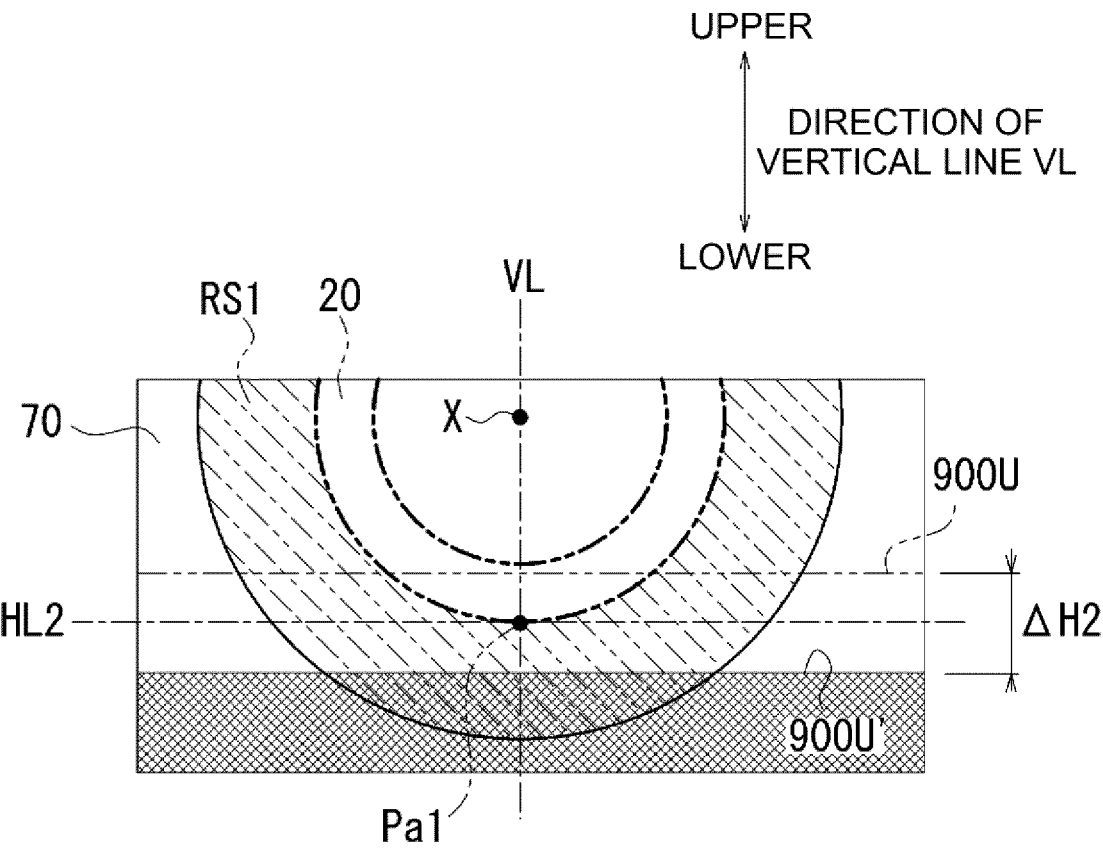
FIG. 25 is a view illustrating the displacement of the oil surface of the oil accumulation portion according to the comparative example.

FIG. 25 is a view illustrating displacement of an oil surface of the oil accumulation portion 900 according to the comparative example. In FIG. 25, the lip seal RS1 and the motor shaft 20 are indicated by virtual lines.

As shown in FIG. 23, the oil accumulation portion 900 according to the comparative example has a substantially semicircular plate shape when viewed from the direction of the rotation axis X. The oil surface 900U of the oil accumulation portion 900 is a flat surface orthogonal to the vertical line VL. The oil accumulation portion 900 does not have a protrusion corresponding to the enlarged portion 91 of the oil accumulation portion 9 according to the present embodiment.

As shown in FIG. 24, when viewed from above in the direction of the vertical line VL, the concave portions 901, 902 are opened at centers in the radial direction of the rotation axis X on the oil surface 900U of the oil accumulation portion 900. The concave portions 901, 902 are recesses respectively corresponding to a shape of the peripheral wall portion 84 of the second cover 8 and a shape of the motor shaft 20.

A thickness of the oil accumulation portion 900 in the direction of the rotation axis X is T3. The thickness T3 of the oil accumulation portion 900 is larger than the thickness T1 of the base portion 90 of the oil accumulation portion 9 according to the present embodiment, and is smaller than the total thickness (T1+T2) of the base portion 90 and the enlarged portion 91 of the oil accumulation portion 9 (T1<T3<(T1+T2), see FIG. 18).

As shown in FIG. 24, an area S900 of the oil surface 900U of the oil accumulation portion 900 is a product of the radial width W1 of the rotation axis X and the thickness T3 in the direction of the rotation axis X (S900=W1×T3). Opening areas of the concave portion 901 and the concave portion 902 in the oil surface 900U are ignored.

The area S900 of the oil surface 900U is smaller than the area S9 (see FIG. 20) of the oil surface 9U of the oil accumulation portion 9 (S900<S9).

Here, a decrease amount ΔV of a volume of the oil accumulation portion 900 caused by the decrease in temperature is the same as the decrease amount ΔV of the oil accumulation portion 9. As shown in FIG. 23, the decrease amount ΔV of the volume of the oil accumulation portion 900 is a product of the area S900 of the oil surface 900U and displacement amount ΔH2 in the direction of the vertical line VL (ΔV=S900×ΔH2).

The area S900 of the oil surface 900U of the oil accumulation portion 900 is smaller than the area S9 of the oil surface 9U of the oil accumulation portion 9. Therefore, in the oil accumulation portion 900, the displacement amount ΔH2 in the direction of the vertical line VL is larger than the displacement amount ΔH1 of the oil accumulation portion 9 (ΔH2>ΔH1).

As shown in FIG. 25, in the oil accumulation portion 900, when the temperature decreases, the oil surface 900U is lowered by ΔH2 in the direction of the vertical line VL. Thus, the oil surface 900U′ after the lowering may be positioned below the horizontal line HL2 passing through the lowest point Pa1. Thus, there is a risk that the supply of the oil OL to the contact portion between the motor shaft 20 and the lip seal RS1 is insufficient. Insufficient lubrication leads to a decrease in durability of the lip seal RS1.

In contrast to this, the oil accumulation portion 9 according to the present embodiment is provided with the enlarged portion 91 to increase the area S9 of the oil surface 9U. Accordingly, even when the volume of the oil OL decreases due to the decrease in temperature, an amount of decrease in height of the oil surface 9U is reduced (see FIG. 22). This reduces a shortage of the supply of the oil OL to the contact portion between the motor shaft 20 and the lip seal RS1.

One aspect of the present invention will be listed below.

(1) The power transmission device 1 (device) includes the motor 2;

the gear device 3 provided on one side of the motor 2 in the direction of the rotation axis X;

the oil accumulation portion 9 provided on the other side of the motor 2 in the direction of the rotation axis X;

the lip seal RS1 (second lubricated member) provided on the oil accumulation portion 9; and the communication passage Q configured to allow the gear device 3 side to communicate with the oil accumulation portion 9.

The gear device 3 includes the planetary reduction gear 4 (first lubricated member).

The communication passage Q is provided above the lowest point Pb of the meshing portion between the ring gear 42 and the small-diameter gear portion 432 which is a lubrication target location of the planetary reduction gear 4 and the lowest point Pa1 of the lip portion RS1*a* (lubrication target location) of the lip seal RS1 on the lower side in the direction of the vertical line VL (gravity direction).

When viewed from the radial direction of the rotation axis X, the oil accumulation portion 9 includes the enlarged portion 91 in which the upper side thereof in the direction of the vertical line VL is thicker than the lower side in the direction of the rotation axis X.

The lowest point Pa1 of the lip seal RS1 is positioned in the enlarged portion 91.

The volume of the oil OL decreases as the temperature decreases. Thus, the oil surface position is lowered.

Here, in a case in which the communication passage Q that allows the gear device 3 side to communicate with the oil accumulation portion 9 is provided below the lowest point Pb of the lubrication target location on the gear device 3 side, the oil surface position on the gear device 3 side is higher than the communication passage Q. Since the oil OL on the gear device 3 side and the oil accumulation portion 9 are connected via the communication passage Q, the oil surface on the gear device 3 side and the oil surface 9U of the oil accumulation portion 9 are maintained at the same height (Pascal's principle). When the oil surface 9U of the oil accumulation portion 9 is lowered, the oil OL moves from the gear device 3 side to the oil accumulation portion 9 side in order to maintain an equilibrium state. Accordingly, even when the temperature decreases, the final oil surface position in the oil accumulation portion 9 is likely to remain above the lowest point Pa1 of the lip seal RS1, which is the lubrication target location.

On the other hand, as shown in one aspect of the present invention, when the communication passage Q is provided above the lowest point Pb of the ring gear 42 as the lubrication target location and the lowest point Pa1 of the lip seal RS1, the oil OL in the gear chamber Sb and the oil accumulation portion 9 may not be connected to each other.

This makes it difficult to maintain the oil surface height of the oil accumulation portion 9 by using Pascal's principle. It is preferable that the oil surface height can be controlled only by the oil accumulation portion 9.

For example, in a power transmission device (vehicle) including the oil accumulation portion 900 (see FIG. 23) according to the comparative example, after the oil OL stops in a high temperature state, the restart is performed in a state in which the oil OL is at an extremely low temperature, the volume of the oil OL decreases due to the decrease in temperature, and the oil surface position is lowered. Thus, there is a concern that the lip seal RS1 is exposed from the oil OL. When the lip seal RS1 is exposed from the oil OL, the lubrication will be insufficient, leading to the decrease in durability of the lip seal RS1.

As a countermeasure, it is conceivable to fill the space Sc with a sufficient amount of oil and keep the oil surface position in the oil accumulation portion 900 sufficiently high so as not to be affected by the change in oil surface. However, since an amount of the oil OL to be used is increased, a weight of the entire power transmission device is increased, and there is a concern of deterioration of fuel efficiency.

Therefore, with this configuration, by providing the enlarged portion 91 in the oil accumulation portion 9 and making the upper side in the gravity direction thicker than the lower side in the direction of the rotation axis X, the oil surface position is less likely to change even if the temperature decreases. Accordingly, even when the oil surface is lowered, the state in which the lowest point Pa1 of the lip seal RS1 is immersed in the oil OL is maintained. Therefore, the amount of oil to be used can be minimized. Accordingly, it is possible to provide the power transmission device 1 with high lubricity that can prevent the decrease in durability of the lip seal RS1 while reducing deterioration of fuel efficiency due to an increase in weight.

(2) The power transmission device 1 includes the motor shaft 20 and the drive shaft DA.

The communication passage Q has a gap CL between the motor shaft 20 and the drive shaft DA.

With this configuration, it is not necessary to separately form a pipe or an oil passage in order to return the oil OL on the space Sc side to the gear chamber Sb side, which is advantageous in terms of weight, cost, and layout.

(3) The cover member 13 (cover) is disposed on the other side of the motor 2 in the direction of the rotation axis X.

The cover member 13 includes the first cover 7 and the second cover 8.

The first cover 7 and the second cover 8 are joined to each other in the direction of the rotation axis X.

The oil accumulation portion 9 is provided in the space Sc between the first cover 7 and the second cover 8.

The first cover 7 has the concave portion 75 recessed in the rotation axis X.

The concave portion 75 is recessed toward the motor 2 in the direction of the rotation axis X, and accommodates the enlarged portion 91 of the oil accumulation portion 9.

When viewed in the radial direction of the rotation axis X, the lower surface 75*b* of the concave portion 75 inclines upward in the direction of the vertical line VL while approaching the motor 2 in the direction of the rotation axis X.

The first cover 7 is formed by casting. A casting direction of the first cover 7 is a direction along the rotation axis X.

Therefore, with this configuration, a draft angle is formed by inclining the lower surface 75*b* of the concave portion 75. This makes it easier to manufacture the first cover 7.

(4) The connector portion 273 of the sensor 27 is disposed in the motor chamber Sa that accommodates the motor 2. The connector portion 273 is positioned on the upper side in the direction of the vertical line VL in the motor chamber Sa and on an inner peripheral side of the coil end 253*a* of the motor 2.

When viewed from the radial direction of the rotation axis X, the concave portion 75 is positioned on the inner peripheral side of the coil end 253*a*. The concave portion 75 is provided at a position that avoids the connector portion 273.

The convex portion 76 that protrudes toward the motor 2 is provided in a region of the first cover 7 opposite the concave portion 75 in the direction of the rotation axis X. A clearance is provided between the convex portion 76 and the coil end 253*a*. The shortest distance L76 between the convex portion 76 and the coil end 253*a* is set to a distance that maintains an insulation distance.

As shown in FIG. 11, the connector portion 273 of the sensor 27 is provided above the rotation axis X in the direction of the vertical line VL. Further, the connector portion 273 is provided on the inner diameter side of the coil end 253*a*. Therefore, in the region around the connector portion 273, the space on the inner diameter side of the coil end 253*a* is narrow. On the other hand, below the rotation axis X in the direction of the vertical line VL, there is the space on the inner diameter side of the coil end 253*a*.

Therefore, with this configuration, by effectively utilizing the space on the inner diameter side of the coil end 253*a* on the lower side in direction of the vertical line VL, it is possible to reduce an increase in size of the cover member 13 in the direction of the rotation axis X.

Therefore, the area S9 of the oil surface 9U of the oil accumulation portion 9 can be increased without increasing the size of the cover member 13.

First Modification

Here, the example in which the oil accumulation portion 9 according to the present embodiment includes the enlarged portion 91 extending from the base portion 90 toward the first cover 7 has been described, but the present invention is not limited to this shape. The oil accumulation portion 9 may have any shape as long as the area of the oil surface can be increased. In the following first modification, only portions different from the present embodiment will be described.

Figure 26:
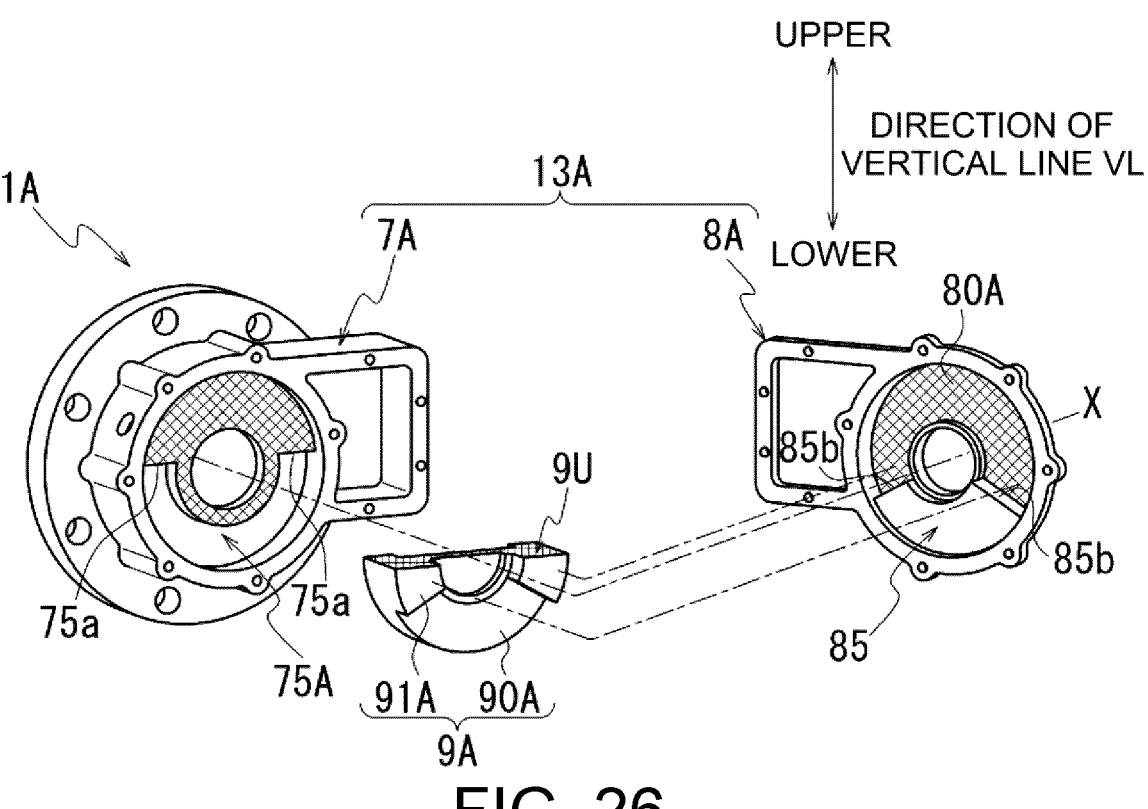
FIG. 26 is a view illustrating an oil accumulation portion according to a first modification.
Figure 27:
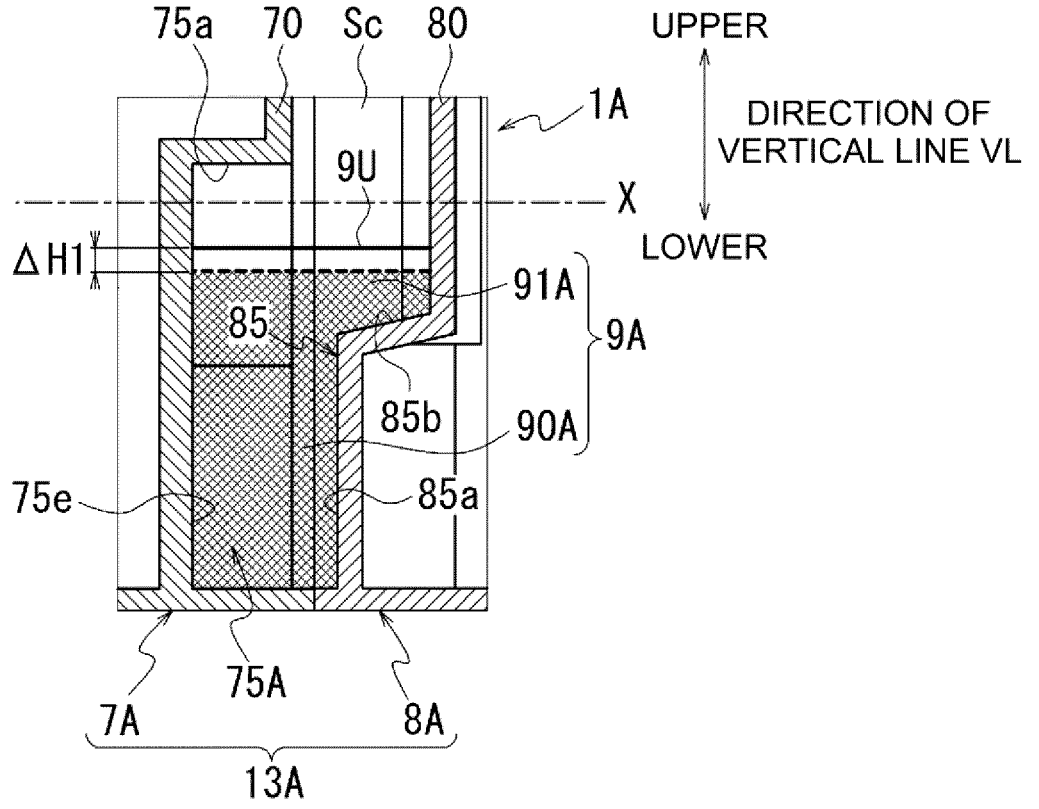
FIG. 27 is a view illustrating the oil accumulation portion according to the first modification.

FIGS. 26 and 27 are views illustrating a power transmission device 1A according to the first modification.

FIG. 26 is an exploded perspective view of a cover member 13A.

FIG. 27 is a schematic view of a cross section of a concave portion 75A in the cover member 13A.

As shown in FIG. 26, in the first cover 7A, the concave portion 75A is formed in an arc shape surrounding the rotation axis X. Further, a second cover 8A includes a convex portion 85 protruding from a wall portion 80A toward the first cover 7. The convex portion 85 has an arc shape surrounding the rotation axis X.

As shown in FIG. 27, in a state in which the first cover 7A and the second cover 8A are joined, the bottom surface 75*e* of the concave portion 75A faces an end surface 85*a* of the convex portion 85 with an interval therebetween in the direction of the rotation axis X. Further, an upper surface 85*b* of the convex portion 85 is positioned lower than the upper surface 75*a* of the concave portion 75A in the direction of the vertical line VL.

The upper surface 85*b* of the convex portion 85 is inclined upward in the direction of the vertical line VL while being separated from the first cover 7A in the direction of the rotation axis X. Further, as shown in FIG. 26, the upper surface 85*b* of the convex portion 85 is inclined upward in the direction of the vertical line VL from an outer diameter side toward an inner diameter side.

As shown in FIG. 27, an oil accumulation portion 9A is formed between the first cover 7A and the second cover 8A. The oil accumulation portion 9A includes the base portion 90A and an enlarged portion 91A that is thicker in the direction of the rotation axis X than the base portion 90A. The enlarged portion 91A extends from the base portion 90A toward the second cover 8A in the rotation axis X.

The oil accumulation portion 9A includes the enlarged portion 91A, and increases an area of the oil surface 9U. Even if a temperature decreases and a volume of the oil accumulation portion 9A decreases, a decrease amount of the oil surface 9U becomes ΔH1. Further, by providing the convex portion 85, an increase in used amount of the oil accumulation portion 9A is reduced.

Accordingly, it is possible to provide the power transmission device 1A with high lubricity that can prevent a decrease in durability of the lip seal RS1 while reducing deterioration of fuel efficiency due to an increase in weight.

(5) The cover member 13A (cover) is disposed on the other side of the motor 2 in the direction of the rotation axis X.

The cover member 13A includes the first cover 7A and the second cover 8A.

The oil accumulation portion 9A is provided in the space Sc between the first cover 7A and the second cover 8A.

The first cover 7A has the concave portion 75A recessed toward the motor 2.

The second cover 8A has the convex portion 85 protruding toward the motor 2.

In the direction of the vertical line VL, the upper surface 85*b* of the convex portion 85 is provided below the upper surface 75*a* of the concave portion 75A, and is inclined upward in the direction of the vertical line VL while being separated from the motor 2.

The second cover 8A is formed by casting. A casting direction of the second cover 8A is a direction along the rotation axis X.

Therefore, with this configuration, a draft angle is formed by inclining the upper surface 85*b* of the convex portion 85. This makes it easier to manufacture the second cover 8A.

Second and Third Modifications

In the present embodiment, the example has been described in which the oil accumulation portion 9 is symmetrical with respect to the vertical line VL passing through the rotation axis X when viewed from the direction of the rotation axis X, and is symmetrical with respect to the rotation axis X when viewed from above in the direction of the vertical line VL. However, a shape of the oil accumulation portion is not limited to a symmetrical shape. For example, a wiring (not shown) for supplying electric power to the motor 2, a signal line connected to a control device, and the like are disposed in the motor chamber Sa. A shape of the concave portion forming the oil accumulation portion may be a shape corresponding to a request for arrangement of each component on the motor chamber Sa side. In the following second and third modifications, only portions different from the present embodiment will be described.

Second Modification

Figures 28, 29:
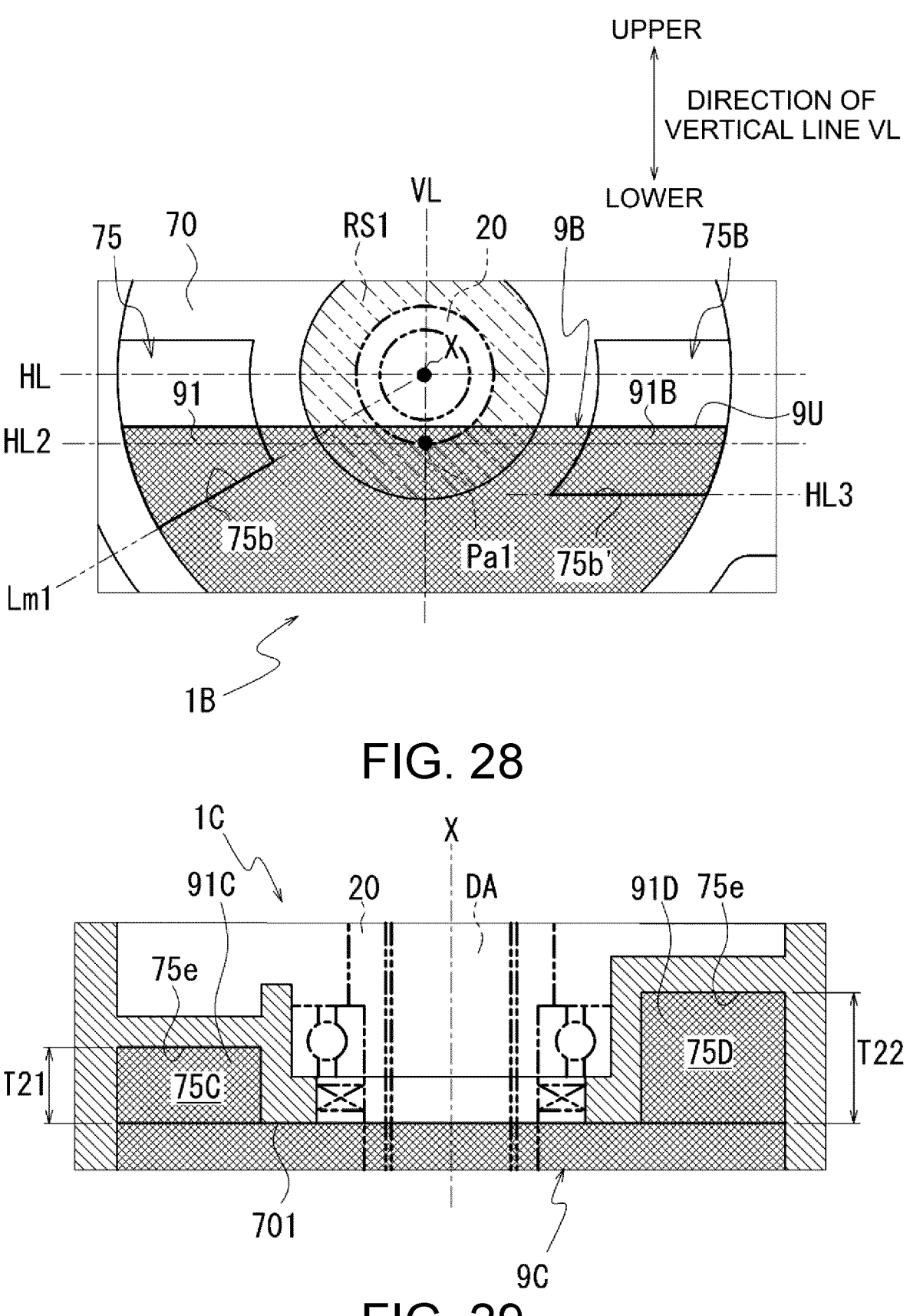
FIG. 28 is a view illustrating an oil accumulation portion according to a second modification.
FIG. 29 is a diagram illustrating an oil accumulation portion according to a third modification.

FIG. 28 is a view illustrating a power transmission device 1B according to a second modification. Further, the lip seal RS1 and the motor shaft 20 are indicated by virtual lines.

As shown in FIG. 28, in the power transmission device 1B according to the second modification, the concave portion 75 (left side in the figure) is provided on one side of the vertical line VL passing through the rotation axis X, and a concave portion 75B (right side in the figure) is provided on the other side. The concave portion 75 and the concave portion 75B are asymmetrical with respect to the vertical line VL.

Specifically, the lower surface 75*b* of the concave portion 75 is provided in a direction along the radial line Lm1 passing through the rotation axis X. On the other hand, a lower surface 75*b'* of the concave portion 75B is provided in a direction along a horizontal line HL3. The concave portion 75B is provided in a range that crosses the horizontal line HL2 passing through the lowest point Pa1 from above to below in the direction of the vertical line VL.

Each of the concave portions 75 and 75B is recessed toward a rear side of the paper from the wall portion 70. The oil OL in the concave portions 75 and 75B forms enlarged portions 91 and 91B of an oil accumulation portion 9B (refer to thick line portions in the figure).

In this case, the concave portions 75 and 75B are asymmetrical with respect to the vertical line VL. Therefore, shapes of the enlarged portions 91 and 91B accommodated in the concave portions 75 and 75B are also asymmetrical with respect to the vertical line VL.

As viewed from the direction of the rotation axis X, the oil accumulation portion 9B includes the common oil surface 9U although the enlarged portions 91 and 91B have different shapes. Therefore, the area of the oil surface 9U can be increased as much as the oil OL is stored in the concave portion 75 and 75B.

(6) The shape of the oil accumulation portion 9B is asymmetrical between the enlarged portion 91 on one side of the vertical line VL passing through the rotation axis X and the enlarged portion 91B on the other side when viewed from the direction of the rotation axis X that is an axial center of the motor 2.

With this configuration, a degree of freedom in disposing the components on the motor chamber Sa side can be improved, and the area of the oil surface 9U of the oil accumulation portion 9B can be ensured.

Third Modification

FIG. 29 is a view illustrating a power transmission device 1C according to a third modification. In FIG. 29, a region corresponding to an oil accumulation portion 9C is cross-hatched. Further, the drive shaft DA and the motor shaft 20 are indicated by virtual lines.

As shown in FIG. 29, in the power transmission device 1C, a concave portion 75C (left side in the figure) is provided on one side of the rotation axis X, and a concave portion 75D (right side in the figure) is provided on the other side when viewed from the direction of the vertical line VL. The concave portion 75C and the concave portion 75D have shapes which are asymmetrical with respect to the rotation axis X.

Specifically, a bottom surface 75e of the concave portion 75C is offset from the side surface 701 by a distance T21 along the direction of the rotation axis X. A bottom surface 75e of the concave portion 75D is offset from the side surface 701 by a distance T22 in the direction of the rotation axis X.

The distance T21 of the concave portions 75C is shorter than the distance T2 (see FIG. 11) from the side surface 701 to the bottom surface 75e according to the present embodiment (T21<T2).

The distance T22 of the concave portion 75D is longer than the distance T2 (see FIG. 11) from the side surface 701 to the bottom surface 75e according to the present embodiment (T22>T2).

Enlarged portions 91C and 91D of the oil accumulation portion 9C are respectively accommodated in the concave portions 75C and 75D.

The concave portions 75C and 75D are asymmetrical with respect to the rotation axis X, and the shapes of the enlarged portions 91C and 91D are also asymmetrical with respect to the rotation axis X.

When viewed from above in the direction of the vertical line VL, the oil accumulation portion 9C has the short enlarged portion 91C and the long enlarged portion 91D. That is, an area of the oil surface of the entire oil accumulation portion 9C is maintained.

(7 and 8) A shape of the oil accumulation portion 9C is asymmetrical between the enlarged portion 91C on the one side and the enlarged portion 91D on the other side of the rotation axis X that is the axial center of the motor 2 when viewed from above in the direction of the vertical line VL.

With this configuration, a degree of freedom in disposing the components on the motor chamber Sa side can be improved, and the area of the oil surface of the oil accumulation portion 9C can be ensured.

The shapes of the concave portions 75 to 75D (enlarged portions 91 to 91D) according to the present embodiment and the first to third modifications can be appropriately combined according to the request for the arrangement of the components on the motor chamber Sa side.

In the present embodiment, the example has been described in which the cover member 13 includes two members, that is, the first cover 7 and the second cover 8, but the present invention is not limited to this aspect. The cover member 13 may include two or more members.

As shown in FIG. 6, the example has been described in which the communication passage Q according to the present embodiment including the pipe P1 constituting an oil supply passage for supplying the oil OL to the space Sc of the cover member 13, and the gap CL constituting an oil return passage for returning the oil OL from the space Sc to the gear chamber Sb, but the present invention is not limited to this aspect. For example, the communication passage may be one that can be used for both supply and discharge. For example, the amount of oil in the space Sc can be appropriately adjusted by switching between the supply and the discharge using a pump or the like.

In an aspect of the present invention, the gear device includes, for example, a gear mechanism and an annular mechanism.

The gear mechanism includes, for example, a reduction gear mechanism, an acceleration gear mechanism, and a differential gear mechanism (differential mechanism).

The reduction gear mechanism and the acceleration gear mechanism include, for example, a planetary gear mechanism and a parallel gear mechanism.

The annular mechanism includes, for example, an endless annular component.

The endless annular component includes, for example, a chain sprocket, a belt, and a pulley.

The differential mechanism is, for example, a bevel gear type differential gear or a planetary gear type differential gear.

The differential mechanism includes a differential case as an input element, two output shafts as output elements, and a differential gear set as a differential element.

In the bevel gear type differential gear, the differential gear set includes bevel gears.

In the planetary gear type differential gear, the differential gear set includes planetary gears.

The power transmission device includes a gear that rotates integrally with the differential case.

For example, a final gear (differential ring gear) of the parallel gear mechanism rotates integrally with the differential case. For example, when a carrier of the planetary gear mechanism is connected to the differential case, a pinion gear rotates (revolves) integrally with the differential case.

For example, a reduction gear mechanism is connected downstream of a motor. A differential gear mechanism is connected downstream of the reduction gear mechanism.

That is, the differential gear mechanism is connected downstream of the motor via the reduction gear mechanism. An acceleration gear mechanism may be used instead of the reduction gear mechanism.

A single-pinion type planetary gear mechanism can use, for example, a sun gear as an input element, a ring gear as a fixed element, and a carrier as an output element.

A double-pinion type planetary gear mechanism can use, for example, a sun gear as an input element, a ring gear as an output element, and a carrier as a fixed element.

As a pinion gear of the single-pinion type planetary gear mechanism or the double-pinion type planetary gear mechanism, for example, a stepped pinion gear or a non-stepped pinion gear can be used.

The stepped pinion gear includes a large pinion and a small pinion. For example, it is preferable to mesh the large pinion with the sun gear. For example, it is preferable to fit the small pinion into the ring gear.

The non-stepped pinion gear is not a stepped pinion gear.

In the present embodiment, the case in which the device is a power transmission device (power train device (transmission, reducer, or the like)) of a vehicle equipped with a motor has been described, but the present invention is not limited thereto. The device may be any device equipped with a motor. For example, the device is a device provided with a motor, the device can also be applied to a device other than a vehicle.

Further, the gear device is an entire mechanism including a gear. For example, in the case of the present embodiment, the gear device 3 includes the planetary reduction gear 4 and the differential mechanism 5 (differential gear).

Here, the term "connected downstream" in this description means a connection relation in which power is transmitted from a component disposed upstream to a component positioned downstream.

For example, the case of the planetary reduction gear connected downstream of the motor (rotation electrical machine) means that the power is transmitted from the motor to the planetary reduction gear. For example, the gear device may be connected downstream of the motor via a transmission mechanism (mechanism having a transmission function (including a stepped transmission mechanism or a continuously variable transmission mechanism), a clutch, or the like. In this case, the connection relation is such that the power of the motor is transmitted to the gear device via the transmission mechanism, the clutch, or the like.

Although the embodiment of the present invention has been described above, the above embodiment is merely an application example of the present invention and is not intended to limit the technical scope of the present invention to the specific configuration of the above embodiment. The embodiment can be changed as appropriate within the scope of the technical idea of the invention.

The present application claims a priority of Japanese Patent Application No. 2022-037177 filed with the Japan Patent Office on Mar. 10, 2022, all the contents of which are hereby incorporated by reference.

DESCRIPTION OF REFERENCE SIGNS 1, 1A to 1C power transmission device (device)
2 motor
3 gear device
4 planetary reduction gear (first lubricated member)
7, 7A first cover
8,8A second cover
9, 9A to 9C oil accumulation portion 13, 13A cover member (cover)
20 motor shaft
75, 75A to 75D concave portion
75b lower surface
85 convex portion
91, 91A to 91D enlarged portion
CL gap (communication passage)
DA drive shaft
HL horizontal line direction
Pa1 lowest point of contact portion between lip seal and motor shaft (lowest point of lubrication target location of second lubricated member)
Pb lowest point of meshing portion between ring gear and small-diameter gear portion (lowest point of lubrication target location of first lubricated member)
Q communication passage
RS1 lip seal (second lubricated member)
Sc space between first cover and second cover
VL vertical line direction (gravity direction)
X rotation axis (axial center of motor)

The invention claimed is:

1. A device comprising:
a motor;
a gear device disposed on one side of the motor and including a first lubricated member;
an oil accumulation portion provided in a cover member on the other side of the motor;
a second lubricated member provided in the oil accumulation portion in an insertion hole of the cover member; and
a communication passage configured to allow a gear device side to communicate with the oil accumulation portion, wherein
the communication passage is provided above respective lowest points on a lower side in a gravity direction of lubrication target locations of the first lubricated member and the second lubricated member,
the oil accumulation portion includes, in a concave portion provided in the cover member, an enlarged portion in which an upper side in the gravity direction is thicker than a lower side in an axial direction,
the lowest point of the second lubricated member is provided at a position overlapping with the concave portion when viewed from a radial direction, and
the concave portion is located on an outer peripheral side of the insertion hole.

2. The device according to claim 1, further comprising:
a motor shaft and a drive shaft, wherein
the communication passage has a gap between the motor shaft and the drive shaft.

3. The device according to claim 1, wherein
the cover member includes a first cover and a second cover,
the oil accumulation portion is provided in a space between the first cover and the second cover,
the first cover has the concave portion that is recessed toward the motor and accommodates the enlarged portion of the oil accumulation portion, and
a lower surface of the concave portion is inclined upward in the gravity direction while approaching the motor.

4. The device according to claim 3, wherein
when viewed from a radial direction, the concave portion is positioned on an inner peripheral side with respect to a coil end of the motor, and
a clearance is provided between the coil end and a region of the first cover where the concave portion is provided.

5. The device according to claim 1, wherein the cover member includes a first cover and a second cover, the oil accumulation portion is provided in a space between the first cover and the second cover, the first cover has the concave portion recessed toward the motor, the second cover has a convex portion protruding toward the motor, and in the gravity direction, an upper surface of the convex portion is provided below an upper surface of the concave portion, and is inclined upward in the gravity direction while being separated from the motor.

6. The device according to claim 1, wherein a shape of the oil accumulation portion is asymmetrical between one side and the other side of a vertical line passing through an axial center of the motor when viewed in the axial direction.

7. The device according to claim 6, wherein the shape of the oil accumulation portion is asymmetrical between one side and the other side of the axial center of the motor when viewed from above in the gravity direction.

8. The device according to claim 1, wherein a shape of the oil accumulation portion is asymmetrical between one side and the other side of an axial center of the motor when viewed from above in the gravity direction.

* * * * *